(12) United States Patent
Noda et al.

(10) Patent No.: US 12,443,658 B2
(45) Date of Patent: Oct. 14, 2025

(54) INFORMATION PROCESSING APPARATUS, INFORMATION PROCESSING METHOD, AND COMPUTER PROGRAM PRODUCT TO PROVIDE GROUPS OF RELATED ELEMENTS

(71) Applicant: KABUSHIKI KAISHA TOSHIBA, Tokyo (JP)

(72) Inventors: Reiko Noda, Kawasaki (JP); Tomoyuki Shibata, Kawasaki (JP); Osamu Yamaguchi, Yokohama (JP); Mieko Asano, Kawasaki (JP); Satoshi Ito, Kawasaki (JP); Naoki Kawamura, Yokohama (JP); Yun Xiang, Fuchu (JP); Yuki Hata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/652,523

(22) Filed: Feb. 25, 2022

(65) Prior Publication Data

US 2023/0042149 A1 Feb. 9, 2023

(30) Foreign Application Priority Data

Aug. 3, 2021 (JP) ................................. 2021-127611

(51) Int. Cl.
*G06F 16/901* (2019.01)
*G06F 16/11* (2019.01)
(Continued)

(52) U.S. Cl.
CPC ........ *G06F 16/9017* (2019.01); *G06F 16/116* (2019.01); *G06F 16/258* (2019.01); *G06F 16/904* (2019.01)

(58) Field of Classification Search
CPC ...... G06F 16/116; G06F 16/258; G06F 16/51; G06F 16/9017; G06F 16/904
See application file for complete search history.

(56) References Cited

U.S. PATENT DOCUMENTS

2007/0239683 A1* 10/2007 Gallagher ............ G06V 10/763
2012/0322037 A1* 12/2012 Raglin .................... G09B 7/00
434/247

(Continued)

FOREIGN PATENT DOCUMENTS

JP          2002-108893 A    4/2002
JP          2005-38006 A     2/2005

(Continued)

OTHER PUBLICATIONS

Nakashima et al., "SIR-Net: Scene-Independent End-to-End Trainable Visual Relocalizer", 3DV, 2019, 10 pages.

(Continued)

*Primary Examiner* — Cheyne D Ly
(74) *Attorney, Agent, or Firm* — Oblon, McClelland, Maier &Neustadt, L.L.P.

(57) ABSTRACT

An information processing apparatus according to one embodiment includes one or more hardware processors coupled to a memory. The one or more hardware processors acquires pieces of target data of different types. The one or more hardware processors generates element information for each element included in the pieces of the target data. The element information indicates the corresponding element. The one or more hardware processors links, with each other, related pieces of the element information and stores the linked pieces of the element information in a storage device.

13 Claims, 14 Drawing Sheets

(51) Int. Cl.
    *G06F 16/25*    (2019.01)
    *G06F 16/904*   (2019.01)

(56) References Cited

U.S. PATENT DOCUMENTS

| | | | | |
|---|---|---|---|---|
| 2013/0205219 | A1* | 8/2013 | Moha | H04L 67/00 |
| | | | | 715/748 |
| 2015/0047037 | A1* | 2/2015 | Wood | G06F 21/55 |
| | | | | 726/23 |
| 2017/0289000 | A1* | 10/2017 | Park | G06F 11/3058 |
| 2018/0373738 | A1 | 12/2018 | Mitarai et al. | |

FOREIGN PATENT DOCUMENTS

| JP | 2005-235099 A | 9/2005 |
|---|---|---|
| JP | 2005-310044 A | 11/2005 |
| JP | 2006-059185 A | 3/2006 |
| JP | 5533201 B2 | 6/2014 |
| JP | 2017-107509 A | 6/2017 |

OTHER PUBLICATIONS

Liu et al., SSD: Single Shot MultiBox Detector, European Conference on Computer Vision, 2016, 20 pages.

Ito et al., "Point Proposal based Instance Segmentation with Rectangular Masks for Robot Picking Task", ACCV, 2020, 13 pages.

Cohen et al., "Sub-Image Anomaly Detection with Deep Pyramid Correspondences", School of Computer Science and Engineering, The Hebrew University of Jerusalem, Israel, 2021, 17 pages.

Bergmann et al., "Uninformed Students: Student-Teacher Anomaly Detection with Discriminative Latent Embeddings", CVPR, 2020, 10 pages.

Decision to Grant a Patent issued Oct. 1, 2024, in corresponding Japanese Patent Application No. 2021-127611 (with English Translation), 3 pages.

* cited by examiner

FIG.2A

INSPECTION TIME/DATE LIST

| INSPECTION TIME AND DATE | INSPECTION CONTENTS |
|---|---|
| 2021/2/1 | MONTHLY INSPECTION |
| 2021/3/1 | MONTHLY INSPECTION |
| 2021/4/1 | MONTHLY INSPECTION |
| 2021/5/1 | MONTHLY INSPECTION |
| 2021/6/1 | MONTHLY INSPECTION |
| 2021/7/1 | MONTHLY INSPECTION |
| 2021/8/1 | MONTHLY INSPECTION |
| 2021/9/1 | MONTHLY INSPECTION |
| 2021/10/1 | ANNUAL INSPECTION |
| 2021/11/1 | MONTHLY INSPECTION |
| 2021/12/1 | MONTHLY INSPECTION |
| 2022/1/1 | MONTHLY INSPECTION |
| 2022/2/1 | MONTHLY INSPECTION |
| 2022/3/1 | MONTHLY INSPECTION |
| 2022/4/1 | MONTHLY INSPECTION |
| 2022/5/1 | MONTHLY INSPECTION |
| 2022/6/1 | MONTHLY INSPECTION |
| 2022/7/1 | ANNUAL INSPECTION |

INSPECTION WORK ORDER SHEET    30B (30)

| INSPECTION ITEM | INSTALLATION POSITION | MONTHLY INSPECTION CONTENTS |
|---|---|---|
| EQUIPMENT A | 4F B-2 | EQUIPMENT 1 INSPECTION WORK ORDER SHEET |

| INSPECTION ITEM | INSTALLATION POSITION | MONTHLY INSPECTION CONTENTS |
|---|---|---|
| EQUIPMENT A | 4F B-2 | EQUIPMENT 1 INSPECTION WORK ORDER SHEET |
| EQUIPMENT B | 4F A-2 | EQUIPMENT 1 INSPECTION WORK ORDER SHEET |
| EQUIPMENT C | 4F B-4 | EQUIPMENT 1 INSPECTION WORK ORDER SHEET |
| EQUIPMENT D | 4F A-5 | EQUIPMENT 2 INSPECTION WORK ORDER SHEET |

30C (30)

DRAWING OF EQUIPMENT 1

A
B
C 30D (30)

INSPECTION REPORT

| INSPECTION ITEM | INSPECTION RESULT |
|---|---|
| TIME AND DATE | 2020/21 |

| NSPECTION ITEM | TIME AND DATE | |
|---|---|---|
| TIME AND DATE | 2020/3/1 | |
| EQUIPMENT A | NO PROBLEM | |
| EQUIPMENT B | NO PROBLEM | |
| EQUIPMENT C | REPLACE A PART | |
| EQUIPMENT D | NO PROBLEM | |

INSPECTION LIST SEARCH

[2021/04/01] TO [2022/01/01] [SEARCH]

1. 2021/04/01 MONTHLY INSPECTION
2. 2021/05/01 MONTHLY INSPECTION
3. 2021/06/01 MONTHLY INSPECTION
4. 2021/07/01 MONTHLY INSPECTION
5. 2021/08/01 ANNUAL INSPECTION

< > NEXT 5

FIG.9

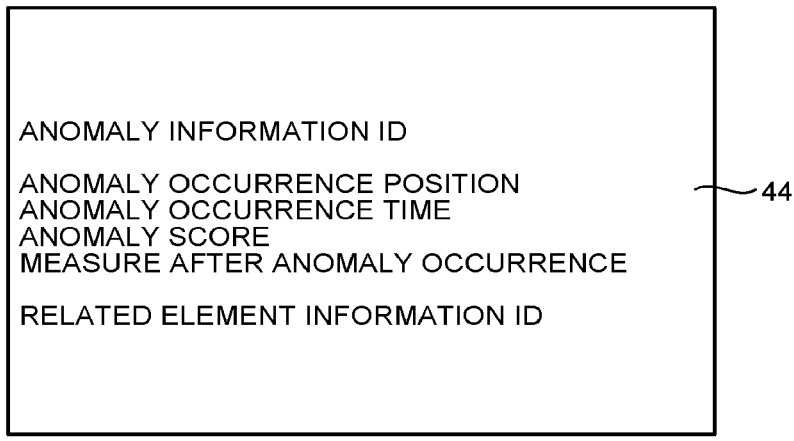

ANOMALY INFORMATION ID

ANOMALY OCCURRENCE POSITION
ANOMALY OCCURRENCE TIME
ANOMALY SCORE
MEASURE AFTER ANOMALY OCCURRENCE

RELATED ELEMENT INFORMATION ID — 44

FIG.10

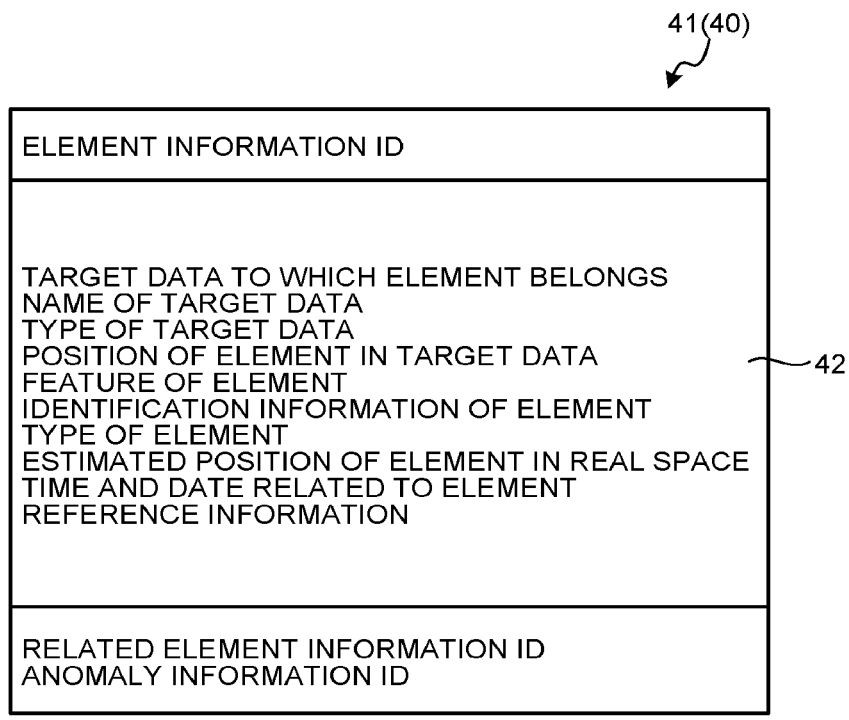

41(40)

ELEMENT INFORMATION ID

TARGET DATA TO WHICH ELEMENT BELONGS
NAME OF TARGET DATA
TYPE OF TARGET DATA
POSITION OF ELEMENT IN TARGET DATA
FEATURE OF ELEMENT
IDENTIFICATION INFORMATION OF ELEMENT
TYPE OF ELEMENT
ESTIMATED POSITION OF ELEMENT IN REAL SPACE
TIME AND DATE RELATED TO ELEMENT
REFERENCE INFORMATION — 42

RELATED ELEMENT INFORMATION ID
ANOMALY INFORMATION ID

INFORMATION PROCESSING APPARATUS, INFORMATION PROCESSING METHOD, AND COMPUTER PROGRAM PRODUCT TO PROVIDE GROUPS OF RELATED ELEMENTS

CROSS-REFERENCE TO RELATED APPLICATIONS

This application is based upon and claims the benefit of priority from Japanese Patent Application No. 2021-127611, filed on Aug. 3, 2021; the entire contents of which are incorporated herein by reference.

FIELD

Embodiments described herein relate generally to an information processing apparatus, an information processing method, and a computer program product.

BACKGROUND

A system for managing various target data of different types has been known. For example, there is a known system that displays, on a display unit, various target data such as drawing data and image data stored in a storage unit. There is another known system that displays image data, which has been selected by an operation instruction made by a user, at a particular position on displayed drawing data ordered by the user in a superimposed manner.

However, in such conventional techniques, elements included in pieces of target data of different types are not linked with each other. Therefore, it is difficult to provide groups of related elements included in the pieces of target data in a manner that the groups can be easily recognized.

BRIEF DESCRIPTION OF THE DRAWINGS

FIG. 2A is a diagram illustrating target data;
FIG. 2B is a diagram illustrating target data;
FIG. 5 is a schematic diagram illustrating a selection screen;
FIG. 9 is a schematic diagram illustrating a data configuration of anomaly information;
FIG. 10 is a schematic diagram illustrating a data configuration of a management DB.

DETAILED DESCRIPTION

An information processing apparatus according to one embodiment includes one or more hardware processors coupled to a memory. The one or more hardware processors configured to: acquire pieces of target data of different types. The one or more hardware processors configured to generate element information for each element included in the pieces of the target data. The element information indicates the corresponding element. The one or more hardware processors configured to link, with each other, related pieces of the element information and store the linked pieces of the element information in a storage device.

Hereinafter, with reference to accompanying drawings, an embodiment of an information processing apparatus, an information processing method, and a computer program product will be described in detail.

Figure 1:
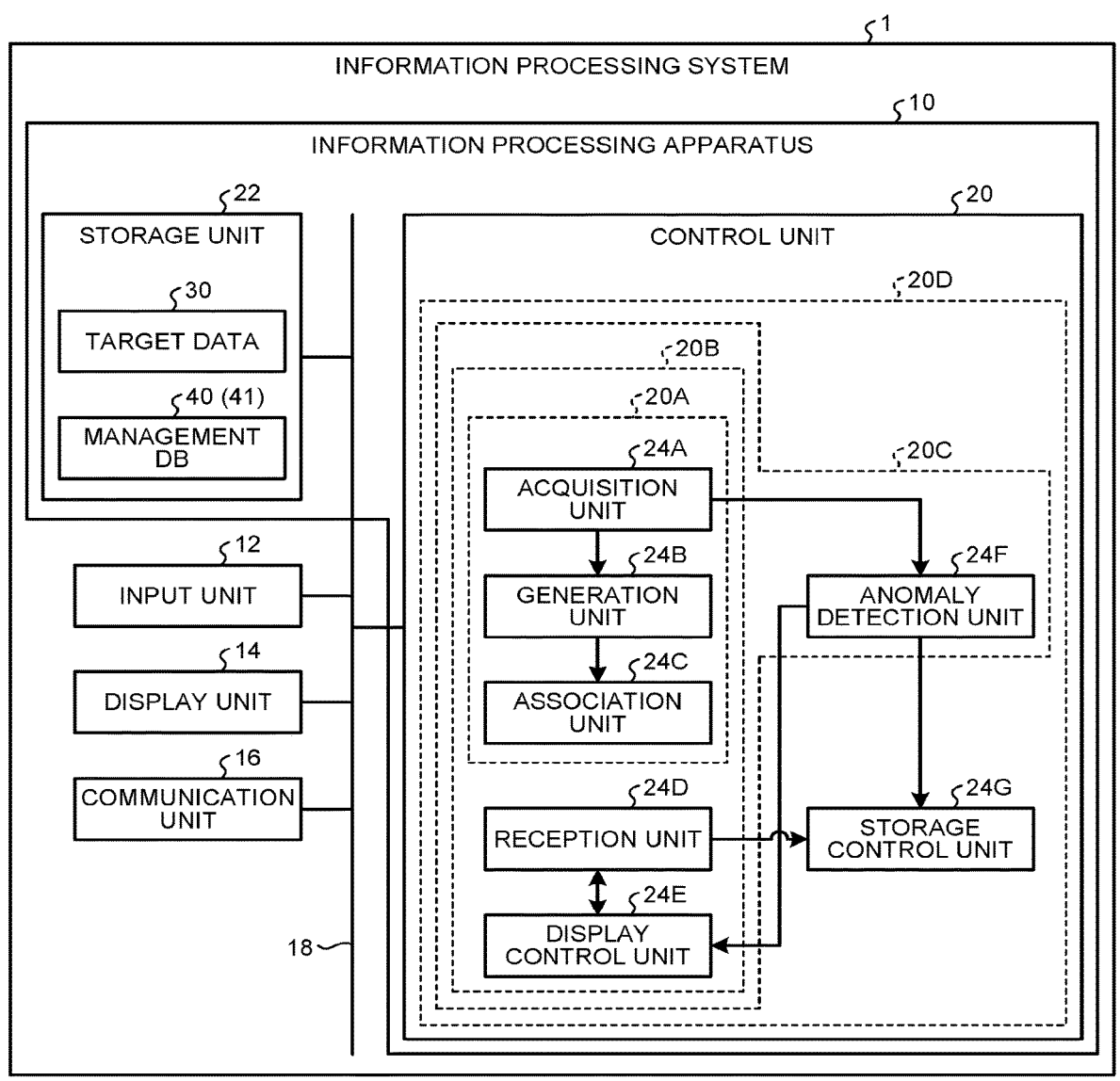
FIG. 1 is a schematic diagram of an information processing system.

FIG. 1 is a schematic diagram illustrating an example of an information processing system 1 of the present embodiment.

The information processing system 1 includes an information processing apparatus 10, an input unit 12, a display unit 14, and a communication unit 16. The information processing apparatus 10, the input unit 12, the display unit 14, and the communication unit 16 are communicably connected via a bus 18, etc.

The input unit 12 receives various operations made by a user(s). The input unit 12 is, for example, a pointing device such as a keyboard and a mouse, a microphone, etc.

The display unit 14 displays various information. The display unit 14 is a display device. Note that a touchscreen integrally including the input unit 12 and the display unit 14 may be used.

The communication unit 16 is a communication interface that communicates, over a network or the like, with another information processing apparatus other than the information processing apparatus 10.

The information processing apparatus 10 includes a control unit 20 and a storage unit 22. The control unit 20 and the storage unit 22 are communicably connected via the bus 18, etc. Note that the information processing apparatus 10 may be configured to include at least one of the control unit 20 and the storage unit 22, the input unit 12, the display unit 14, and the communication unit 16. The control unit 20 and the storage unit 22 may be separately installed and communicably connected over a wired or wireless network.

The storage unit 22 is a storage or memory device that stores various data. The storage unit 22 is, for example, a RAM, a semiconductor memory element such as a flash memory, a hard disk, an optical disk, or the like. Note that the storage unit 22 may be a storage device provided outside the information processing apparatus 10.

In the present embodiment, the storage unit 22 stores target data 30 and a management DB 40.

The target data 30 is the data serving as a target to be subjected to a later-described process in the information processing apparatus 10. The storage unit 22 stores pieces of target data 30 of different types.

The pieces of target data 30 of different types refer to pieces of the target data 30 in which at least one of a data format, a data type, a data structure, and data contents is different.

The data format refers to a recording form of data and may be referred to as a file format in some cases. Regarding the data format, for example, in a case that the target data 30 is image data, examples of the data format includes Joint Photographic Experts Group (JPG), Graphics Interchange Format (GIF) and Portable Network Graphics (PNG), and Microsoft Windows (registered trade name) Bitmap Image (BMP). In a case that the target data 30 is a document file, examples of the data format include a document format and a text format. In a case that the target data 30 is a video file, examples of the data format include MPEG-4 (mp4), Advanced Video Coding (avc), and Windows (registered trade name) Media Video (wmv). In a case that the target data 30 is a CAD drawing, examples of the data format include dgw, Drawing Exchange Format (dxf), and Scalable Vector Graphics (SVG).

The data type corresponds to a label of each group, which is given to data categorized by a common quality on the basis of predetermined categorization criteria. The data type is, for example, documents, images, videos, sound, etc. Note that the data types may be further finely categorized. For example, images, which are an example of the data type, may be further categorized into design drawings, captured images, etc.

The data structure represents a form of storing data. The data structure is, for example, structured data such as statistical data and unstructured data such as images. Note that the data structure may be further finely categorized.

The data contents means contents represented by data. For example, in a case that the target data 30 is image data, when at least one of a captured angle, a captured direction, captured time and date is different, data contents are different even if the image data captures the same target. Also, for example, in a case that the target data 30 is data representing inspection results, if at least one of an object such as equipment of an inspection target, inspection conditions, etc. is different, data contents are different.

FIG. 2A to FIG. 2F are diagrams illustrating examples of the target data 30. In the present embodiment, the information processing apparatus 10 is described by taking, as an example, a case that the target data 30 of multiple types related to inspections is used. Also, the description will be given by taking, as an example, a case that the inspection target is equipment provided in a facility or the like. Note that the target data 30 which is a processing target of the information processing apparatus 10 is not limited to the target data 30 related to inspections.

FIG. 2A is a schematic diagram illustrating an example of a data configuration of an inspection time/date list 30A. The inspection time/date list 30A is an example of the target data 30. The inspection time/date list 30A is, for example, document data in which inspection time and date and inspection contents are linked. The inspection contents include, for example, monthly inspections and annual inspections.

FIG. 2B is a schematic diagram illustrating an example of a data configuration of an inspection work order sheet 30B. The inspection work order sheet 30B is an example of the target data 30. The inspection work order sheet 30B is a table in which, for example, inspection items, installation positions of equipment serving as the inspection items, and inspection contents are linked with each other.

Figures 2C, 2D:
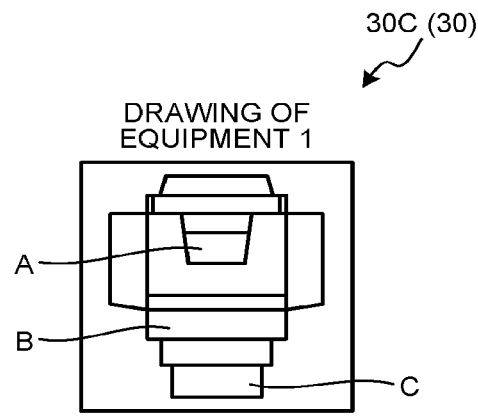
FIG. 2C is a diagram illustrating target data.
FIG. 2D is a diagram illustrating target data.

FIG. 2C is a schematic diagram illustrating an example of a drawing 30C of equipment 1. The drawing 30C of the equipment 1 is an example of the target data 30. The drawing 30C of the equipment 1 is an example of drawing data of the equipment 1 including parts such as a part A, a part B, and a part C.

FIG. 2D is a schematic diagram illustrating an example of a data configuration of an inspection report 30D. The inspection report 30D is an example of the target data 30.

The inspection report 30D is an example of document data indicating a report in which inspection items and inspection results are linked with each other.

Figure 2E:
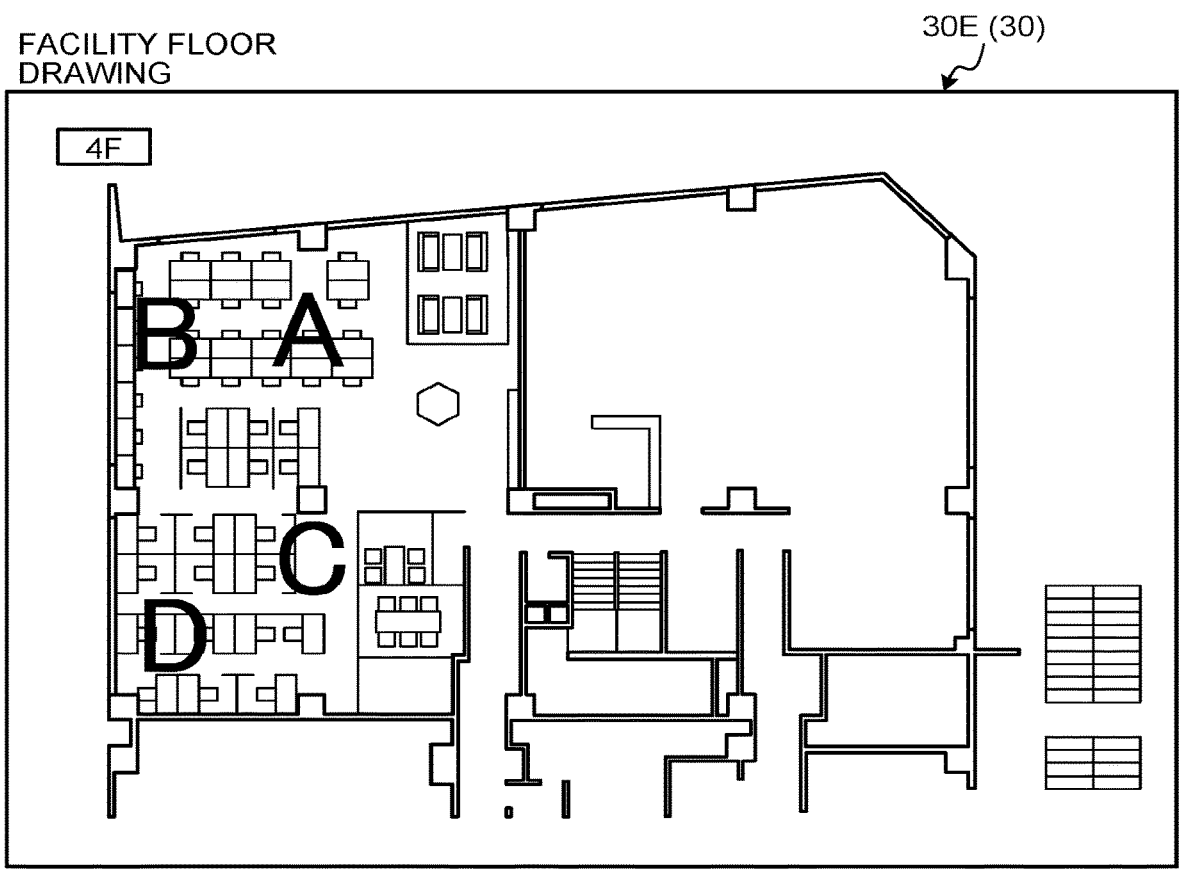
FIG. 2E is a diagram illustrating target data.

FIG. 2E is a schematic diagram illustrating an example of a facility floor drawing 30E. The facility floor drawing 30E is an example of the target data 30. The facility floor drawing 30E is an example of floor drawing data of a facility in which the equipment 1 is installed. The facility floor drawing 30E illustrates, for example, respective positions of the equipment A to the equipment D in the facility.

Figure 2F:
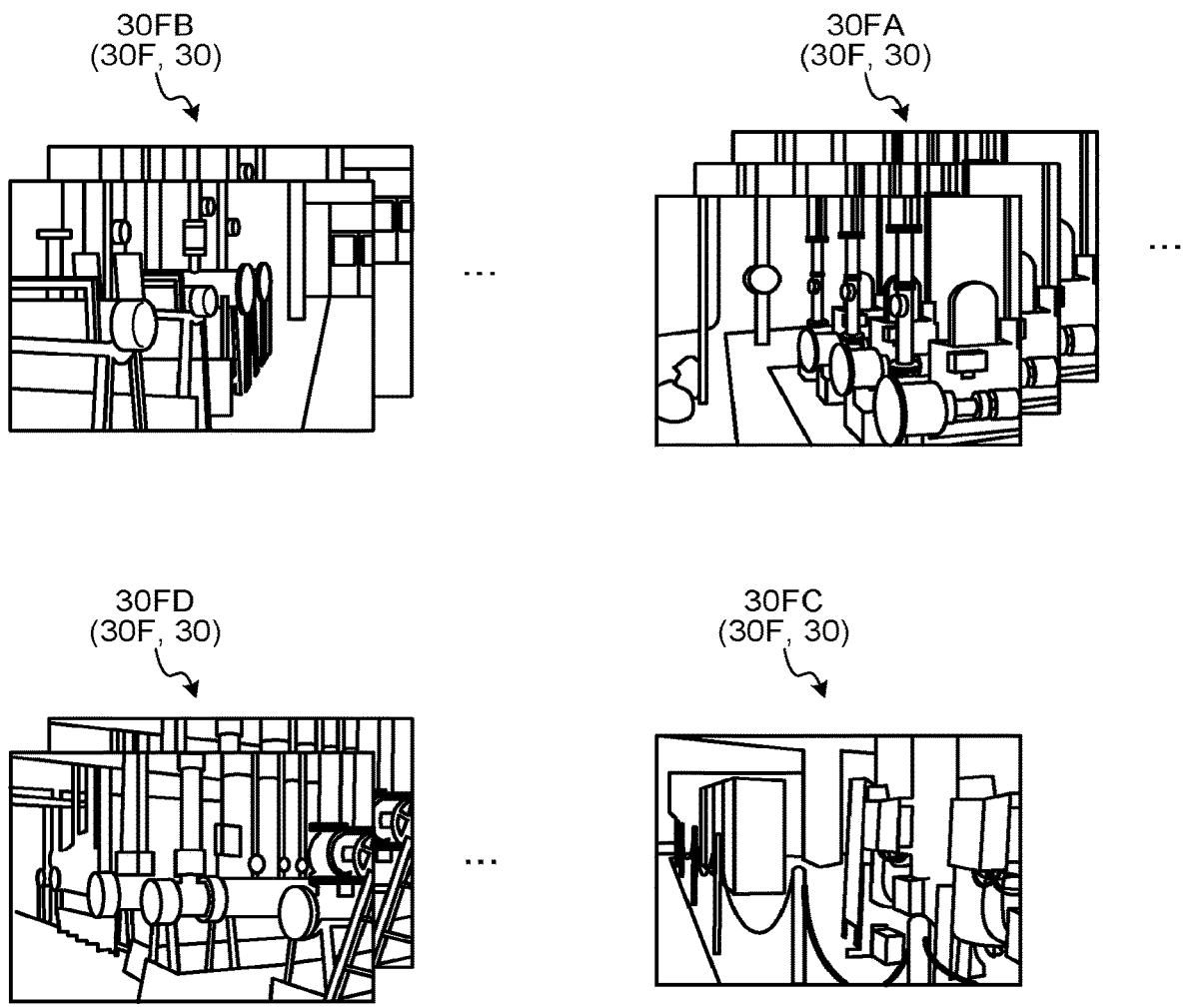
FIG. 2F is a diagram illustrating target data.

FIG. 2F is a schematic diagram illustrating examples of inspection images 30F. The inspection images 30F are examples of the target data 30. In the present embodiment, the inspection images 30F are described by taking forms, which are captured images captured in inspection work of each of the equipment A to equipment D, as examples. Specifically, in the present embodiment, the case that an inspection image 30FA of the equipment A, an inspection image 30FB of the equipment B, an inspection image 30FC of the equipment C, and an inspection image 30FD of the equipment D are used as the inspection images 30F is described as an example.

As illustrated in FIG. 2A to FIG. 2F, in the present embodiment, the storage unit 22 stores the target data 30 of multiple types. The target data 30 may be stored in the storage unit 22 by the later-described control unit 20 or may be stored in the storage unit 22 in advance.

Returning to FIG. 1, the description will be continued.

The control unit 20 executes various information processing in the information processing apparatus 10. The control unit 20 includes an acquisition unit 24A, a generation unit 24B, an association unit 24C, a reception unit 24D, a display control unit 24E, an anomaly detection unit 24F, and a storage control unit 24G.

The acquisition unit 24A, the generation unit 24B, the association unit 24C, the reception unit 24D, the display control unit 24E, the anomaly detection unit 24F, and the storage control unit 24G are implemented by one or more hardware processors. For example, the above described units may be implemented by executing a program by the hardware processors such as a central processing unit (CPU) and a graphics processing unit (GPU), in other words, by implemented by software. Each of the above described units may be implemented by a hardware processor such as a dedicated IC, in other words, implemented by hardware. Each of the above described units may be implemented by a combination of software and hardware. In a case that multiple processors are used, each of the processors may implement one of the units or two or more of the units.

Note that the control unit 20 may be configured as a first control unit 20A including the acquisition unit 24A, the generation unit 24B, and the association unit 24C. Also, the control unit 20 may be configured as a second control unit 20B including the acquisition unit 24A, the generation unit 24B, the association unit 24C, the reception unit 24D, and the display control unit 24E. Also, the control unit 20 may be configured as a third control unit 20C including the acquisition unit 24A, the generation unit 24B, the association unit 24C, the reception unit 24D, the display control unit 24E, and the anomaly detection unit 24F. Also, the control unit 20 may be configured as a fourth control unit 20D including the acquisition unit 24A, the generation unit 24B, the association unit 24C, the reception unit 24D, the display control unit 24E, the anomaly detection unit 24F, and the storage control unit 24G.

In the present embodiment, a form in which the control unit 20 is configured as the fourth control unit 20D including the acquisition unit 24A, the generation unit 24B, the association unit 24C, the reception unit 24D, the display control unit 24E, the anomaly detection unit 24F, and the storage control unit 24G is described as an example.

The acquisition unit 24A acquires pieces of target data 30 of different types. The acquisition unit 24A may acquire the target data 30 from an external information processing apparatus via the communication unit 16. Also, the acquisition unit 24A may acquire the pieces of target data 30 from the storage unit 22. Also, every time new target data 30 is stored in the storage unit 22, the acquisition unit 24A may acquire the target data 30. In the present embodiment, a form in which the acquisition unit 24A acquires pieces of target data 30 from the storage unit 22 is described as an example.

For each element included in the pieces of target data 30 acquired by the acquisition unit 24A, the generation unit 24B generates element information indicating the corresponding element.

The generation unit 24B specifies, from among the pieces of target data 30 acquired by the acquisition unit 24A, the target data 30 for which element information has not been generated. Then, for each of the specified one or more pieces of target data 30, the generation unit 24B generates element information of elements included in each target data 30.

The element means each target which is included in the target data 30 and can be categorized and identified. Examples of the elements include equipment, parts, objects, items, character strings, and inspection items included in the target data 30.

As described above, in the present embodiment, the information processing apparatus 10 is described by taking, as an example, the case that the target data 30 of multiple types related to inspections of each of pieces of equipment is used. Also, in the present embodiment, the form in which the elements include equipment will be described as an example. Also, the object to which the equipment, which is an example of the element, belongs to is a facility or the like provided with the equipment.

For each target data 30, the generation unit 24B specifies the elements included in the target data 30 and generates element information for each of the specified elements.

The element information is information indicating the corresponding element and is information by which this element in the target data 30 can be specified.

Figure 3:
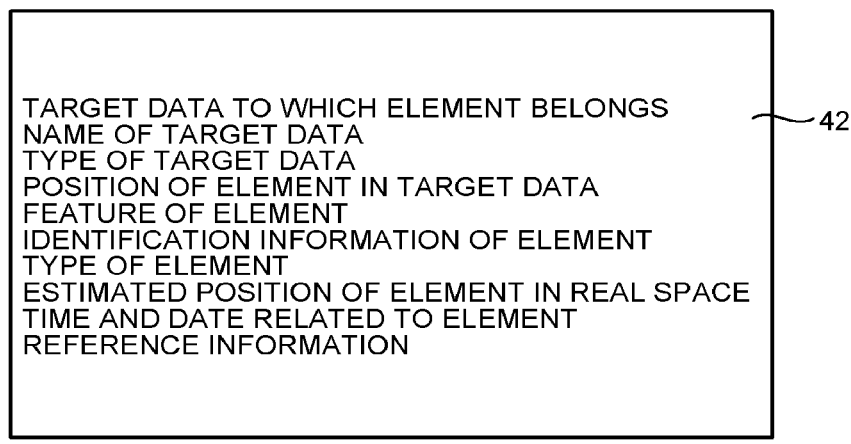
FIG. 3 is a diagram illustrating a data configuration of element information.

FIG. 3 is information illustrating an example of a data configuration of element information 42. The element information 42 includes information related to at least one item of, for example, the target data 30 to which the element belongs, a name of the target data 30 to which the element belongs, a type of the target data 30 to which the element belongs, a position of the element in the target data 30, a feature of the element, identification information of the element, a type of the element, an estimated position in real space of the element, time and date related to the element, and reference information indicating a reference address related to the element. Note that the element information 42 is only required to be the information which indicates the element of the target data 30, but is not limited to the information of these items.

The target data 30 to which the element belongs to is information indicating a storage location of this target data 30. The name of the target data 30 is a file name or the like of the target data 30.

The type of the target data 30 is information indicating the type of the target data 30. The type of the target data 30 may be information indicating a data format, a data type, a data structure, or data contents of the target data 30 such as an image capturing an inspection location, a computer aided design (CAD) drawing of an inspection facility, an inspection work order sheet, an inspection report, an inspection list, a drawing image of an inspection facility, and map data of an inspection facility.

The position of the element in the target data 30 is information by which the position of this element in the target data 30 can be specified. For example, in a case that the target data 30 is table data, the position of the element in the target data 30 is information indicating the position of a cell at which the element is registered. In a case that the target data 30 is image data, the position of the element in the target data 30 is information expressed as a pixel position, a group of pixel positions, position coordinates, or a group of position coordinates in the image data. In a case that the target data 30 is vector data such as CAD data, the position of the element in the target data 30 is information by which one or more object groups included in the CAD data can be specified. Also, in a case that the target data 30 is document data, the position of the element in the target data 30 is information indicating the position in the document data by the number of bytes, expressing the position by a row number and a column number, or the information indicating a section number. Also, in a case that the target data 30 is document data in which the target data 30 is tagged by Extensible Markup Language (XML) or the like, the position of the element in the target data 30 may be the information indicating the tag. Also, in a case that the target data 30 is data including tables or diagrams, the position of the element in the target data 30 may be the information indicating captions of these tables or diagrams.

The feature of the element is expressed by, for example, a feature vector of this element. As the feature, a publicly known feature can be used. The generation unit 24B may use the feature, which corresponds to the type or the uses, etc. of processing of the target data 30, as the feature of the element.

The identification information of the element is information which uniquely identifies this element. For example, it is assumed that the element is equipment. In this case, equipment identity document (ID) can be used as the identification information of the element. The equipment ID is, for example, the information by which the identification information of the equipment of an inspection target provided in a facility of the inspection target or part of the equipment can be uniquely specified. Note that the equipment ID is only required to be given to each equipment in advance. Also, for example, a serial number or the like of the equipment may be used as the equipment ID.

The type of the element is information indicating the type of this element. For example, it is assumed that the element is equipment. In this case, for example, the type of the element is equipment type ID. The equipment type ID is only required to be the information by which the type such as a model of the equipment can be identified.

The estimated position of the element in real space is information indicating the estimated position of the element in the real space. For example, the estimated position of the element in the real space is information indicating the estimated position of the element in an inspection facility.

The time and date related to the element is information indicating the time and date related to the element. The time and date related to the element is, for example, creation time and date of the target data 30 including the element, time and date information included in the element, etc.

The reference information is information indicating a reference address related to the corresponding element. The reference information is sometimes referred to as a hyperlink.

The generation unit 24B generates the element information 42 of each element, which is included in the target data 30, by carrying out analytical processing corresponding to the type of the target data 30. The analytical processing is, for example, image processing, drawing analytical processing, document analytical processing, etc. It is only required to carry out at least one of these analytical processing, and the analytical processing is not limited to these analytical processing.

For example, it is assumed that the target data 30 is image data capturing an inspection part.

In this case, the generation unit 24B specifies each of objects included in the target data 30, which is the image data, as each of the elements included in the target data 30.

The generation unit 24B specifies the elements included in the target data 30 by using, for example, a technique of recognizing objects in an image with rectangles or a technique of extracting an object region by estimating regions of individual objects in an image. Examples of the technique of recognizing objects in an image as rectangles include a technique disclosed in "Liu, W., Anguelov, D., Erhan, D., Szegedy, C., Reed, S., Fu, C. Y., & Berg, A. C. (2016, October). Ssd: Singleshot multibox detector. In European conference on computer vision (pp. 21-37). Springer, Cham." Examples of the technique of extracting an object region include a technique disclosed in "S. Ito and S. Kubota," Point Proposal based Instance Segmentation with Rectangular Masks for Robot Picking Task, "ACCV2020".

The generation unit 24B generates the element information 42 for each of the elements specified from the target data 30.

For example, the generation unit 24B specifies a storage location of the target data 30 to which the element belongs to, the name of the target data 30, and the type of the target data 30.

Also, the generation unit 24B specifies the position of the element in the target data 30 by specifying the pixel position or the like of this element in the target data 30.

Moreover, the generation unit 24B calculates the feature of the element included in the target data 30. For example, the generation unit 24B calculates the feature of the element by using a histograms of oriented gradients (HOG) feature, a deep learning feature, etc. For the deep learning feature, for example, a convolutional neural network (CNN), which carries out class categorization learned by using a massive amount of images such as ImageNet is used. For example, as the deep learning feature, the generation unit 24B uses intermediate output in front of a final layer for carrying out the class categorization by the CNN.

Moreover, the generation unit 24B specifies the identification information and the type of the element included in the target data 30. Descriptions will be given by assuming, for example, a case that the element is equipment. In this case, the generation unit 24B recognizes a region of the equipment included in the image data. The region of the equipment is, for example, a barcode captured in an image, a Quick Response (QR) (registered trade name) code, or a character string. Then, the generation unit 24B specifies the identification information of the element and the type of the element by analyzing the recognized equipment region by using one or more publicly known image recognition methods or the like. For example, the generation unit 24B specifies a serial number of the equipment as equipment ID, which is an example of the identification information of the element. Also, the generation unit 24B specifies a model of the equipment, a model number of the equipment, or the like as the type of the element.

Moreover, the generation unit 24B specifies an estimated position of the element, which is included in the target data 30, in real space. For example, the generation unit 24B specifies a captured position and a captured direction of image data by analyzing the whole image data or the region of the element included in the image data by using one or more publicly known image recognition methods or the like. Then, furthermore, the generation unit 24B specifies the estimated position of the element in the real space by specifying a captured position and a captured direction of the element by using one or more publicly known image recognition methods or the like.

Note that the generation unit 24B may use, as the captured position, the position of a camera which has captured the target data 30. In this case, the generation unit 24B can use, as the captured position, the camera position expressed by information of Global Positioning System (GPS) included in the image data. Also, the generation unit 24B may specify the captured position by processing of comparing with other image data for which the target data 30 and the captured position have been specified. As a method to specify the captured position by the comparison process, for example, a method disclosed in "R. Nakashima and A. Seki," SIR-Net: Scene Independent End-to-End Trainable Visual Relocalizer, "3DV, 2019" can be used.

Also, the generation unit 24B specifies the time and date related to the element included in the target data 30. For example, the generation unit 24B can specify, for example, the creation time and date of the target data 30 to which the element belongs to, the time and date possessed by the element per se, or the like as the time and date related to the element. As the creation time and date of the target data 30, for example, captured time and date or the like of image data, which is the target data 30, can be used. As the time and date possessed by the element per se, for example, information indicating time and date such as a character string expressing time and date, inspection date, or the like included in the region expressing the element in the target data 30 can be used.

Also, the generation unit 24B may specify update time and date of the target data 30 to which the element belongs to as the time and date related to the element. Also, the generation unit 24B may further extract update time and update contents of the target data 30 to which the element belongs and include the update time and update contents in the element information 42. Also, in some cases, the target data 30 include position information indicating a creation position of the target data 30. In this case, the generation unit 24B may further extract the position information and include the information in the element information 42.

Also, in a case that a hyperlink is set for the element included in the target data 30, the generation unit 24B specifies the set hyperlink as reference information.

The generation unit 24B generates, as the element information 42, information of each of the items specified and extracted by the above-described processes.

Meanwhile, it is assumed that the target data 30 is image data obtained by scanning printed paper of a wiring diagram, a drawing, a document, and the like, or the target data 30 is image data which is a CAD drawing made into an image.

In this case, after converting the image data to document data of tables, texts, or the like, the generation unit 24B can generate the element information 42 by carrying out a process similar to that in a later-described case where the target data 30 is document data. Also, the generation unit 24B may convert the image data to vector data. In the case that the image data is converted to vector data, the generation unit 24B can generate the element information 42 by carrying out a process similar to that of a later-described case that the target data 30 is CAD data. Note that, in the conversion to the document data or the vector data, for example, line segment detection using Hough conversion or the like, symbol detection, character-string recognition processing such as Optical Character Recognition (OCR), or the like can be used.

Meanwhile, it is assumed that the target data 30 is document data.

In this case, when the target data 30 being document data includes a table, the generation unit 24B specifies a caption, each cell, or a row of the table as one element. Also, when the target data 30 being document data includes a diagram, the generation unit 24B can specify the element by subjecting the diagram to a process similar to that of the case that the target data 30 is image data. Also, the generation unit 24B may collectively specify captions and images of the diagram included in the document data, which is the target data 30, as one element. Also, when the data format of the target data 30 being document data is a text format, the generation unit 24B may specify a character string, which is set in advance and expressing equipment or the like, as the element.

Then, the generation unit 24B can generate the element information 42 for the specified element in a manner similar to that described above.

Meanwhile, it is assumed that the target data 30 is drawing data expressed by vector data such as CAD data.

In vector data such as CAD data, layer information, colors, etc. are given to line segments and objects included in the CAD data. For example, equipment, which is an example of the element included in CAD data, is expressed as a particular figure formed of multiple line segments and objects. For example, the generation unit 24B stores, in advance, template images expressing equipment, cable connectors, and members constituting part of the equipment. Then, the generation unit 24B specifies each equipment as the element by using a publicly known template matching process or the like using the target data 30, which is CAD data, and the template images.

Then, the generation unit 24B can generate the element information 42 for the specified element in a manner similar to that described above.

Note that the generation unit 24B may further extract information of other equipment or the like drawn, for example, near a specified element in the target data 30, information of a character string drawn at a position connected to a specified element by a dimensional note or the like, etc., as the element information 42 of the element. Also, with respect to a specified element, the generation unit 24B may further extract a connection relation with particular figures such as other equipment connected by objects such as line segments or polylines, part of the equipment, and wiring connectors as the element information 42 of the element.

Also, regarding the items which are difficult to be specified from the target data 30 among the items included in the element information 42, the generation unit 24B may use the information input by operation instructions of the input unit 12 made by the user.

For example, in some cases, it is difficult for the generation unit 24B to analyze the estimated position of the element in real space from the target data 30. In this case, the generation unit 24B may register an estimated position, which has been input by an operation instruction of the input unit 12 made by the user, in the element information 42 as the information indicating the estimated position of the element in real space.

The generation unit 24B may carry out a generation process of the element information 42 collectively with respect to all the target data 30 stored in the storage unit 22. In this case, the acquisition unit 24A can acquire all the target data 30 stored in the storage unit 22. Also, every time new target data 30 for which the element information 42 has not been generated is acquired by the acquisition unit 24A, the generation unit 24B may carry out a generation process of the element information 42 with respect to the target data 30. Also, with respect to the target data 30 specified as a processing target by the user, the generation unit 24B may carry out a generation process of the element information 42. In this case, the acquisition unit 24A can acquire the target data 30, which has been selected by an operation of the input unit 12 made by the user, from among the target data 30 stored in the storage unit 22.

The generation unit 24B gives element information ID to the generated element information 42 and stores the information in the storage unit 22. The element information ID is identification information which uniquely identifies the element information 42.

Returning to FIG. 1, the description will be continued. The association unit 24C links related pieces of element information 42 with each other and stores the linked pieces of the element information 42 in a storage unit 22.

For example, to each of pieces of element information 42, the association unit 24C gives element information ID of related other element information 42 as related element information ID. Note that the association unit 24C may categorize the pieces of element information 42 into related pieces of element information 42 and store each categorized group in a different storage location in the storage unit 22.

In the present embodiment, the association unit 24C registers the element information ID, the element information 42, and the related element information ID in the management DB 40 so as to have association among them.

Figure 4:
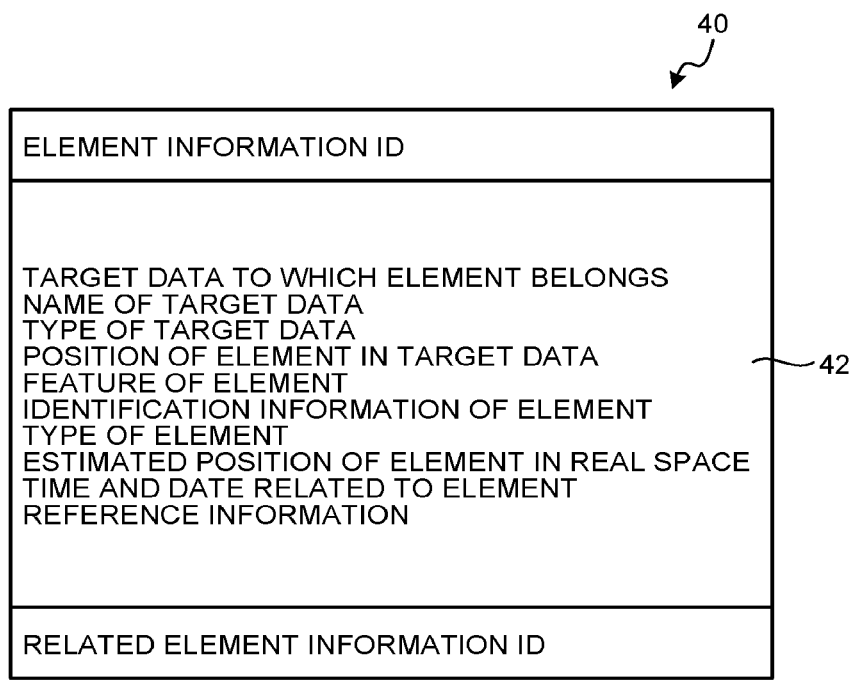
FIG. 4 is a schematic diagram illustrating a data configuration of a management DB.

FIG. 4 is a schematic diagram illustrating an example of a data configuration of the management DB 40. The management DB 40 is a database in which the element information ID, the element information 42, and the element information ID related is linked. Note that the data format of the management DB 40 may be a table or the like and is not limited to a database.

The association unit 24C links each of the element information 42, which is included in the management DB 40 in which the element information ID and the element information 42 is linked and registered by the generation unit 24B, with related element information ID and registers the information. By this registration process, the association unit 24C links related pieces of element information 42 with each other and stores the linked pieces of information in a storage unit 22. Specifically, pieces of the element information 42, each including the same item or the similar item of multiple items included in the element information 42, are linked with each other and are stored in the storage unit 22. For example, the association unit 24C links the element information 42 of the same or similar element or the element information 42 of the element at the same position or a similar position and stores the information in the storage unit 22.

For example, with respect to each of the pieces of element information 42 stored in the storage unit 22, the association unit 24C executes a comparison process of comparing the element information with each of other pieces of element information 42 and specifies the element information 42 of the other related element.

Specifically, for example, the association unit 24C specifies, as the related piece of the element information 42, another piece of the element information 42, in which a similarity of at least one item included in the element information 42 is equal to or higher than a threshold value. Then, the element information ID of the other specified element information 42 is linked with the related element information ID and is registered in the management DB 40.

For example, the association unit 24C searches for other element information 42 which has the same "estimated position of the element in real space" included in the element information 42. The same estimated position means that a difference between the estimated positions is within a range determined in advance. The association unit 24C links, as related element information ID, the element information ID of the element information 42 with the element information ID of other element information 42 having the same "estimated position of the element in real space" included in the element information 42 and registers the element information ID in the management DB 40.

Also, the association unit 24C searches for other element information 42 having the same "position of the element in the target data 30" included in the element information 42. The same position of the element in the target data 30 means that a difference in the positions of the elements is within a range determined in advance. The association unit 24C links, as related element information ID, the element information ID of the element information 42 with the element information ID of other element information 42 having the same "position of the element in the target data 30" included in the element information 42 and registers the element information ID in the management DB 40.

Note that, if the types of the target data 30 to which the elements serving as comparison targets belong are different, the association unit 24C may compare the positions of the elements in the target data 30 after converting the types to the same type. For example, it is assumed that the element information 42 of the element included in the target data 30 being image data and the element information 42 of the element included in the target data 30 being drawing data are compared with each other. In this case, the association unit 24C can compare the positions of the included elements after converting the drawing data to image data.

Also, the association unit 24C may compare the similarities between the positional relations of multiple elements included in the target data 30 which is the image data and the positional relations of multiple elements included in the target data 30 which is drawing data. Then, the association unit 24C may link the element information 42 of the element having the highest similarity as related element information 42.

Also, the association unit 24C searches for other element information 42 having the same or similar "feature of the element" included in the element information 42. For example, the association unit 24C calculates the similarities of "features of the elements" between pieces of element information 42. In the calculation of the similarities of the features, cosine similarities or the like can be used, for example. The association unit 24C specifies, as other related element information 42, other element information 42 having the calculated similarity which is equal to or higher than a threshold value. Then, the association unit 24C links, as related element information ID, the element information ID of the element information 42 with the element information ID of other element information 42 having the same or similar "feature of the element" included in the element information 42 and registers the element information ID in the management DB 40. In this case, the association unit 24C can link pieces of element information 42 having similar features.

Also, the association unit 24C searches for other element information 42 having at least one of the same or similar "identification information of the element" and "type of the element" included in the element information 42. Then, the association unit 24C links, as related element information ID, the element information ID of the element information 42 with the element information ID of other element information 42 having at least one of the same or similar "identification information of the element" and "type of the element" included in the element information 42 and registers the element information ID in the management DB 40.

Also, the association unit 24C may link, as related element information ID, the element information ID of other element information 42 having matched or similar "time and date related to the element" included in the element information 42 and registers the element information ID in the management DB 40. The similar "time and date related to the element" means that a difference in the time and date related to the elements is within a period determined in advance.

Also, the association unit 24C searches for other element information 42 having at least one of the same or similar "target data 30 to which the element belongs", "name of the target data 30", and "type of the target data 30" included in the element information 42. Then, the association unit 24C links, as related element information ID, the element information ID of the element information 42 with the element information ID of other element information 42 having at least one of the same or similar "target data 30 to which the element belongs", "name of the target data 30", and "type of the target data 30" included in the element information 42 and registers the element information ID in the management DB 40.

Note that, in some cases, with respect to a single piece of element information 42, two or more other related pieces of element information 42 are present. In this case, the association unit 24C can link related element information IDs with a single element information ID and store those IDs.

As in the above-described manner, the association unit 24C links each of the pieces of element information 42 with each of the related element information 42 and stores the information in the management DB 40 of the storage unit 22.

Therefore, the pieces of element information 42 are in a state of having association between related pieces of the element information 42.

It is assumed, for example, that pieces of the element information 42 included in each of the pieces of target data 30 illustrated in FIG. 2A to FIG. 2F are linked. As described above, FIG. 2A to FIG. 2F are examples of the target data 30 of multiple types related to inspections of pieces of equipment.

It is assumed that the association unit 24C links the pieces of element information 42 included in the target data 30 of the multiple types.

More specifically, for example, it is assumed that the generation unit 24B generates, as the element information 42 of elements, each of the rows of the inspection time/date list 30A from the inspection time/date list 30A. The element information 42 of the inspection time/date list 30A includes, for example, inspection time and date which is "time and date related to the elements" and inspection contents expressing monthly inspections or annual inspections.

In this case, from among the pieces of element information 42 included in the inspection time/date list 30A, the association unit 24C links the element information 42 expressing monthly inspections as the inspection contents with the element information 42, which is expressing monthly inspections in the inspection work order sheet 30B. Also, from among the pieces of element information 42 included in the inspection time/date list 30A, the association unit 24C links the element information 42 expressing annual inspections as the inspection contents with the element information 42 expressing annual inspections in the inspection work order sheet 30B.

Also, the association unit 24C links each of the pieces of element information 42 included in the inspection time/date list 30A with the element information 42 which is included in the inspection report 30D and has matching or similar inspection time and date as "time and date related to the element". For example, the element information 42 in which the inspection time and date serving as "time and date related to the element" included in the inspection time/date list 30A is "Feb. 1, 2021" is linked with the element information 42 in which the inspection result serving as "time and date related to the element" included in the inspection report 30D is "Feb. 1, 2021". Similarly, the element information 42 in which the inspection time and date serving as "time and date related to the element" included in the inspection time/date list 30A is "Mar. 1, 2021" is linked with the element information 42 in which the inspection result serving as "time and date related to the element" included in the inspection report 30D is "Mar. 1, 2021".

It is assumed, for example, that the generation unit 24B generates, as the element information 42 of an element, each of the rows of the inspection work order sheet 30B from the inspection work order sheet 30B.

In this case, from among the pieces of element information 42 included in the inspection work order sheet 30B, the association unit 24C links the element information 42 expressing the equipment A as the inspection item serving as "identification information of the element" with the element information 42 expressing the equipment A as "identification information of the element" included in the inspection report 30D.

Also, the association unit 24C links the element information 42 expressing the equipment A as "identification information of the element" included in the inspection work order sheet 30B with the element information 42 expressing the equipment A as "identification information of the element" included in the facility floor drawing 30E. Also, the association unit 24C links the element information 42 expressing the equipment A as "identification information of the element" included in the inspection work order sheet 30B with the element information 42 expressing the equipment A as "identification information of the element" included in the inspection image 30F.

Also with respect to the equipment B to the equipment C, similarly, the association unit 24C links the element information 42 included in the target data 30 of multiple types with each of the element information 42 expressing the same equipment.

Also, all the pieces of element information 42 expressing the equipment A to equipment C included in the inspection work order sheet 30B have equipment 1, which is the same "type of the element". Therefore, the association unit 24C links the pieces of element information 42 expressing each of the equipment A to equipment C as the element information 42 expressing the same "type of the element".

Also, the association unit 24C links the element information 42, which includes the character string "A part" included in the inspection report 30D, with the element information 42, which includes the same character string "A part" included in the drawing 30C of the equipment 1.

Also, the association unit 24C mutually links the element information 42, in which at least one of the target data 30 to which the element belongs, the name of the target data 30, the type of the target data 30, the position of the element in the target data 30, the feature of the element, the identification information of the element, the type of the element, the estimated position of the element in real space, the time and date related to the element, and reference information which are the items included in the element information 42 matches or is similar.

Therefore, for example, the element information 42 of the elements of the equipment A to the equipment D included in the facility floor drawing 30E is linked with the element information 42 of the elements of the equipment A to the equipment D included in the target data 30 of another type such as the inspection image 30F. Also, regarding the pieces of the element information 42 included in the target data 30 of the same type, the element information 42 in which at least one of the items included in the element information 42 matches or is similar is linked. In other words, the association unit 24C can carry out association of the pieces of element information 42, which is included in each of the pieces of target data 30 of different types, for each of related elements.

Also, the association unit 24C can mutually link the element information 42 of the elements having the same or a similar estimated position in real space out of the pieces of element information 42 belonging to mutually different target data 30 by carrying out comparison and association of the "estimated position of the element in real space", which is an item included in the element information 42.

Returning to FIG. 1, the description will be continued.

The reception unit 24D receives selection of the element information 42. The display control unit 24E carries out control of displaying various images on the display unit 14.

For example, the display control unit 24E displays, on the display unit 14 (a display device), a selection screen for receiving selection of the element information 42.

FIG. 5 is a schematic diagram illustrating an example of a selection screen 52. The display control unit 24E displays, on the display unit 14, the selection screen 52 including a list of the element information 42 generated by the generation unit 24B. For example, the display control unit 24E extracts any of the items included in each of the pieces of element information 42 registered in the management DB 40 and displays the items by the selection screen 52.

As an example, FIG. 5 illustrates an example in which the inspection time and date and the inspection contents included in the inspection time/date list 30A are displayed by the selection screen 52. The user selects the element information 42 of the element of a display target by operating the input unit 12 while checking the selection screen 52. For example, the user inputs a range of the inspection time and date. The reception unit 24D receives selection of the element information 42 including the received range of the inspection time and date by receiving the range of the inspection time and date from the input unit 12.

Returning to FIG. 1, the description will be continued. The display control unit 24E displays, on the display unit 14, a display screen including the selection-received element information 42 and other element information 42 linked with the element information 42.

Figure 6:
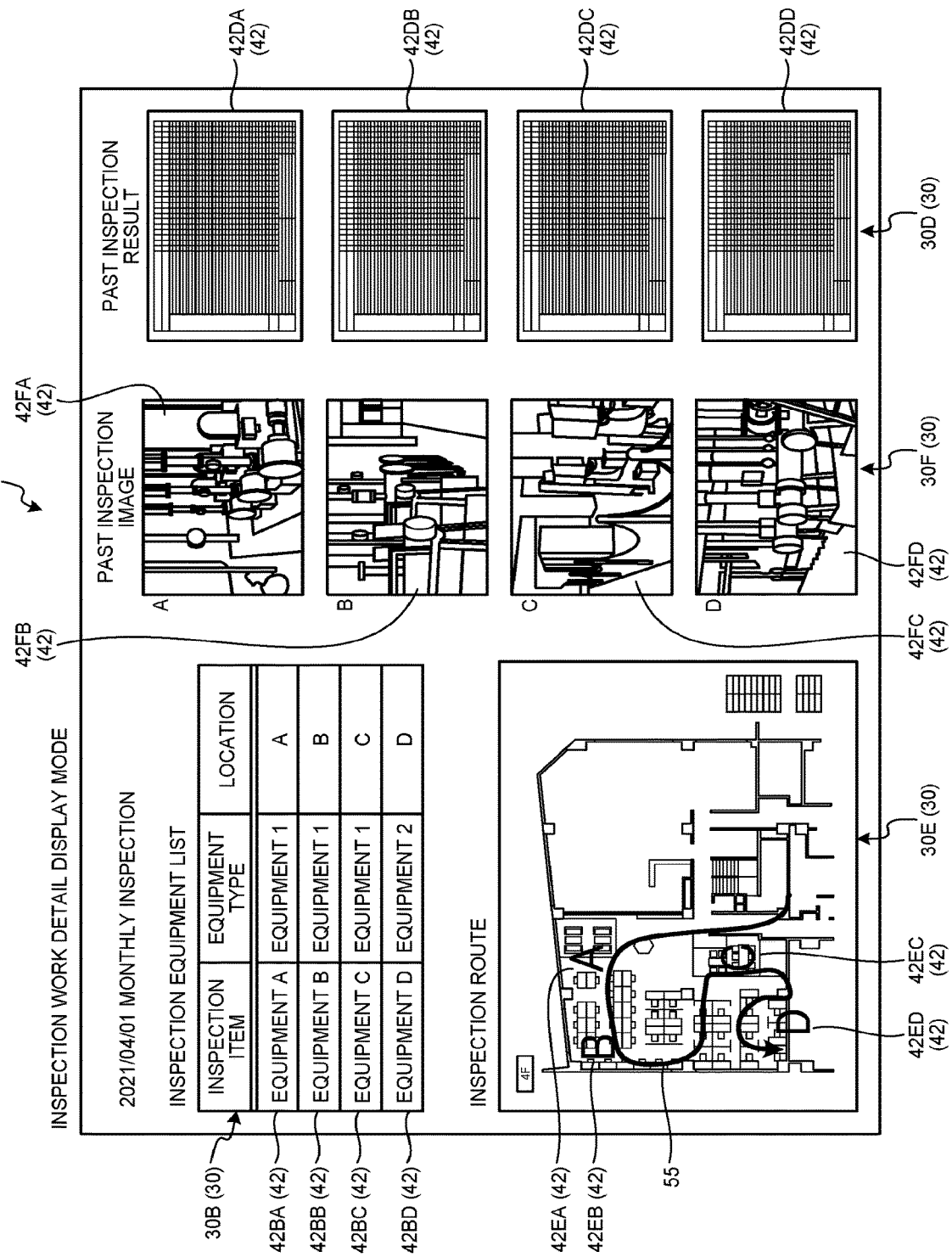
FIG. 6 is a schematic diagram illustrating a display screen.

FIG. 6 is a schematic diagram illustrating an example of a display screen 54. The display screen 54 is an example of a display screen 50 including the related pieces of the element information 42.

In this case, the display control unit 24E reads out, from the management DB 40, the related element information ID which is linked with the selection-received element information 42. Then, the display control unit 24E reads out, from the management DB 40, the element information 42 which corresponds to the read element information ID. The display control unit 24E generates the display screen 50, which includes the selection-received element information 42 and the element information 42 linked with the element information 42. The display control unit 24E then displays the display screen on the display unit 14.

It is assumed, for example, that a user specifies desired element information 42 in the inspection time/date list 30A. The display control unit 24E displays the display screen 50 including the specified element information 42 and other element information 42 linked with the element information 42.

Specifically, for example, it is assumed that a user specifies a range of inspection time and date and operates a search button by operating the input unit 12 while visually checking the selection screen 52 illustrated in FIG. 5. The display control unit 24E extracts, from the management DB 40, a list of the element information 42 including the "time and date related to the element" in the specified range of the inspection time and date, which has been received via the reception unit 24D, and displays the list by the selection screen 52. Then, furthermore, it is assumed that a user selects the element information 42 of "2021/04/01 MONTHLY INSPECTION" from among the element information 42 displayed by the selection screen 52. In this case, the display control unit 24E receives selection of the element information 42 of "2021/04/01 MONTHLY INSPECTION".

The display control unit 24E generates the display screen 54, which includes the selection-received element information 42 and other element information 42 linked with the element information 42, and displays the display screen on the display unit 14.

Note that other element information 42 related to the selection-received element information 42 includes the element information 42, which is identified by the related element information ID linked with the selection-received element information 42, and the element information 42, which is identified by the related element information ID further linked with the element information 42, in the management DB 40. Also, element information 42, which is identified by the related element information ID further linked with the element information 42, may be included.

As a result, the display screen 54 illustrated in FIG. 6 is displayed on the display unit 14.

As illustrated in FIG. 6, the display screen 54 includes element information 42BA, element information 42BB, element information 42BC, and element information 42BD in the inspection work order sheet 30B including "MONTHLY INSPECTION", which is the inspection contents included in the element information 42 of "2021/04/01 MONTHLY INSPECTION". The element information 42BA is the element information 42 of the equipment A included in the inspection work order sheet 30B. The element information 42BB is the element information 42 of the equipment B included in the inspection work order sheet 30B. The element information 42BC is the element information 42 of the equipment C included in the inspection work order sheet 30B. The element information 42BD is the element information 42 of the equipment C included in the inspection work order sheet 30B.

Also, the display control unit 24E displays, by the display screen 54, the element information 42 further linked with other element information 42 linked with the element information 42 of "2021/04/01 MONTHLY INSPECTION". For example, the display control unit 24E displays, by the display screen 54, element information 42EA of the equipment A, element information 42EB of the equipment B, element information 42EC of the equipment C, and element information 42ED of the equipment D of the facility floor drawing 30E.

Also, the display control unit 24E displays, by the display screen 54, element information 42FA of the equipment A, element information 42FB of the equipment B, element information 42FC of the equipment C, element information 42FD of the equipment D included in the inspection images 30F. Also, the display control unit 24E displays, by the display screen 54, element information 42DA of the equipment A, element information 42DB of the equipment B, element information 42DC of the equipment C, element information 42DD of the equipment D included in the inspection report 30D.

In this manner, the display control unit 24E displays, on the display unit 14, the display screen 54 which includes the selection-received element information 42 and other element information 42 linked with the element information 42 in the management DB40.

Therefore, the user can easily recognize the groups of the related elements included in the pieces of target data 30 by visually checking the display screen 54. Also, the user can easily recognize not only the selected element information 42, but also a list of other element information 42 related to the selected element information 42. Also, the user can easily recognize a list of the element information 42, which is included in the pieces of target data 30 of different types and related to the selected element information 42, by the single display screen 54.

Note that the display control unit 24E may display the information, which expresses a recommended inspection route, in a superimposed manner onto the facility floor drawing 30E included in the display screen 54. For example, as illustrated in FIG. 6, the display control unit 24E may display a line image 55, which expresses a recommended inspection route, in a superimposed manner. The information, which expresses the recommended inspection route, can be stored in the storage unit 22 in advance. Also, the display control unit 24E may generate the information, which expresses a recommended inspection route, and display the information by the display screen 54.

Also, in some cases, the element information 42 includes reference information. In this case, the display control unit 24E may display, on the display unit 14, the information which is expressed by the reference information.

Figure 7:
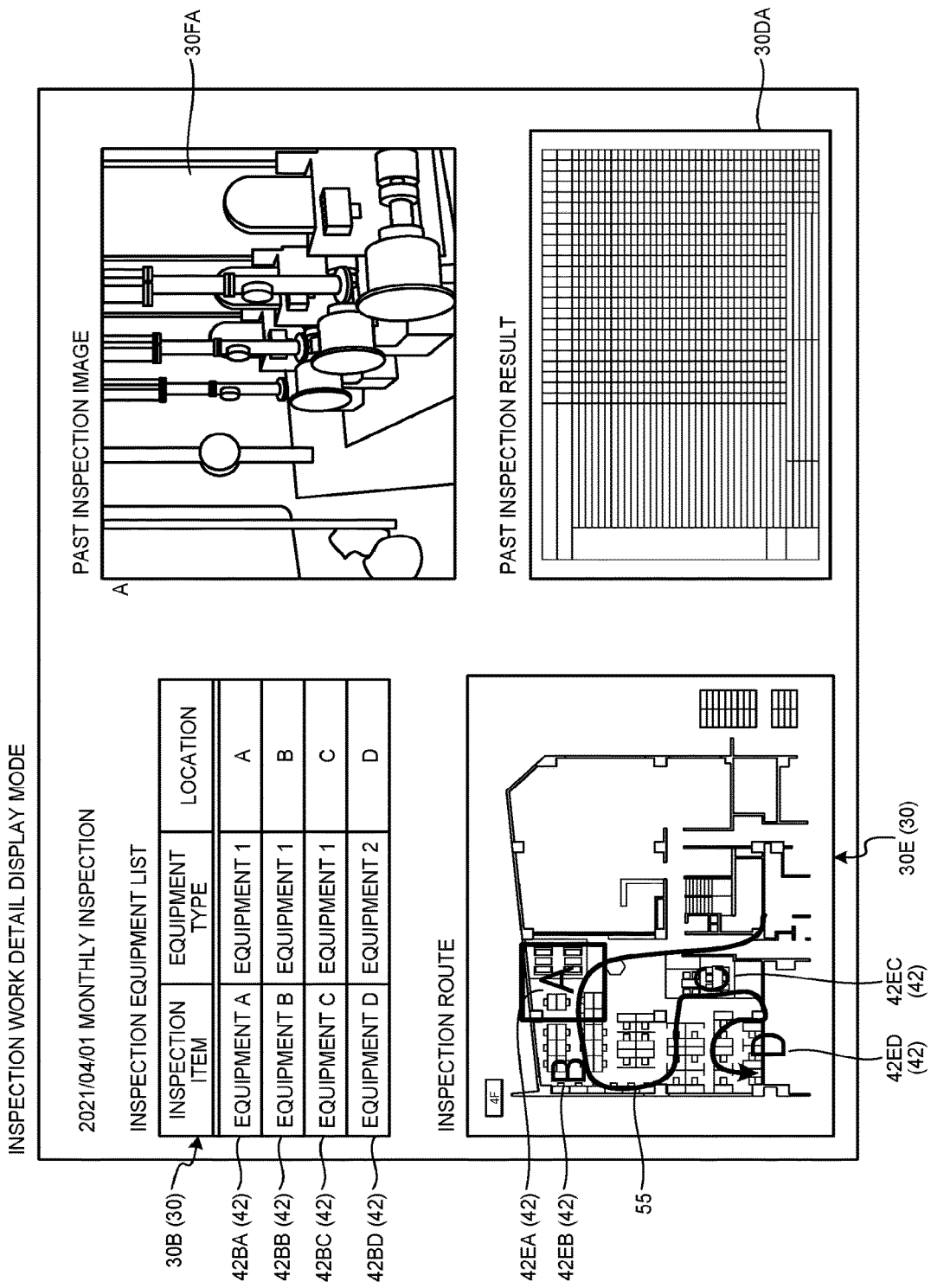
FIG. 7 is a schematic diagram illustrating a display screen.

FIG. 7 is a schematic diagram illustrating an example of a display screen 56. The display screen 56 is an example of the display screen 50. For example, it is assumed that the region of the equipment A, which is the element information 42EA to which a hyperlink is given in the facility floor drawing 30E, is operated by an operation instruction of the input unit 12 made by a user. In this case, the display control unit 24E displays, on the display unit 14, the information of a reference address expressed by the reference information included in the element information 42EA. In FIG. 7, it is assumed that the information of a reference address expressed by a hyperlink is a past inspection image 30FA of the equipment A and a past inspection result 30DA of the equipment A.

Note that, when other element information 42 (for example, the element information 42EB), to which a hyperlink is given, is designated by the user, the display control unit 24E can display, on the display screen 56, the information of the reference address which is expressed by the reference information included in the element information 42EB.

Therefore, by visually checking the display screen 54, the user can easily recognize the groups of the related elements included in the pieces of target data 30 and the information of the reference addresses expressed by the hyperlinks.

Also, for example, when an inspection of an infrastructure facility is to be carried out, the user can easily recognize other related element information 42 and the information of reference addresses by specifying a position on the inspection route or the element information 42 of the element. Therefore, the user can easily recognize and collect the before/after-inspection information by visually checking the display screen 50.

Returning to FIG. 1, the description will be continued.

Next, the anomaly detection unit 24F will be described. The anomaly detection unit 24F detects anomaly included in the target data 30.

For example, with respect to pieces of target data 30 of the same type with different creation time and date, the anomaly detection unit 24F mutually compares the elements located at the same position in the target data 30. Then, the anomaly detection unit 24F detects, as anomaly, the element(s) which has a difference equal to or higher than a predetermined threshold value.

More specifically, it is assumed, for example, that the target data 30 is image data. In this case, the anomaly detection unit 24F specifies elements such as facilities of the inspection targets included in the captured image data. Then, the anomaly detection unit 24F reads the image data, which is linked with the element information 42 of the specified element and is other target data 30 with different captured time and date, from the storage unit 22. The anomaly detection unit 24F subjects the image data of the specified element and other read image data to a position adjustment process so that the elements such as the positions of the inspection target become the same position in the images. The anomaly detection unit 24F detects, as an anomaly, the element which has a difference between the image data undergone the position adjustment equal to or higher than a predetermined threshold value.

Also, for example, it is assumed that the anomaly detection unit 24F detects, from the target data 30 being image data, general abnormalities occurring in facilities or equipment. The general abnormalities are, for example, cracks, rust, and the like which occur in facilities and equipment. In this case, the anomaly detection unit 24F may detect the abnormalities included in the target data 30 by using a learned model.

For example, by using a deep neural network or the like, a learned model which detects the presence/absence of cracks and rust and positions of the cracks and rust from a massive amount of images of cracks and rust can be learned in advance and used in detection of abnormalities. Also, a learned model which categorizes input images to the images including cracks or rust and the images not including cracks or rust may be used. Also, a learned model which outputs presence/absence of cracks and rust and deterioration degrees may be used. Also, a learned model which outputs types of abnormalities such as cracks and rust may be used. Also, a learned model which outputs presence/absence of cracks and rust and positions and regions of abnormalities in a pixel unit may be used.

Also, a learned model which uses learning images to which only presence/absence of cracks and rust has been taught as input and uses anomaly scores of pixels or pixel block units as output may be used. In this case, the learned model can be learned in advance so that maximum values of output anomaly scores match presence/absence of the abnormalities included in the input learning images.

By using the learned model which outputs the anomaly scores of pixel or pixel block units from image data, the anomaly detection unit 24F can detect abnormalities in pixel or pixel block units.

Also, with respect to the target data 30 which is pieces of image data having different captured time and date, the anomaly detection unit 24F carries out a position adjustment process in a manner similar to that described above so that the elements such as positions of the inspection target become the same position in the images. Then, the anomaly detection unit 24F may compare deep learning features among the image data which has undergone the position adjustment and determine the regions, in which the difference in the deep learning features of the corresponding position is equal to or higher than a predetermined threshold value, as abnormalities. For the deep learning features, for example, a method disclosed in "Sub-Image Anomaly Detection with Deep Pyramid Correspondences" (https://arxiv.org/abs/2005.02357) can be used.

Also, the anomaly detection unit 24F may detect abnormalities by using a learned model, which has been learned by only using normal image data not including abnormalities. For this detection method of abnormalities, for example, Paul Bergmann, Michael Fauser, David Sattlegger, Carsten Steger, Uninformed Students: Student-Teacher Anomaly Detection with Discriminative Latent Embeddings, CVPR2020" can be used.

When anomaly is detected, the display control unit 24E displays an anomaly detection result including the detected anomaly on the display unit 14.

Figure 8:
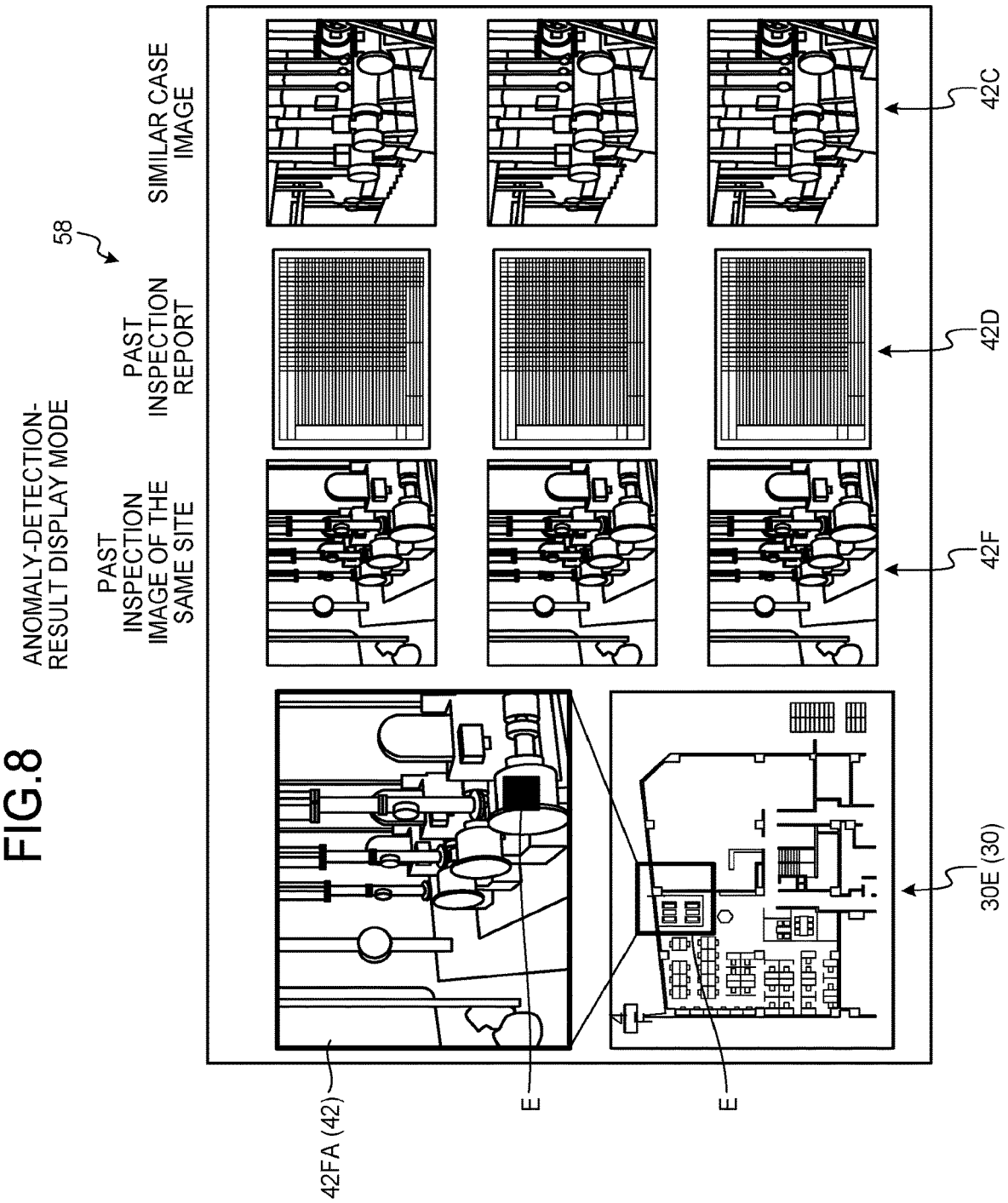
FIG. 8 is a schematic diagram illustrating a display screen of an anomaly detection result.

FIG. 8 is a schematic diagram illustrating an example of a display screen 58 of an anomaly detection result. FIG. 8 illustrates a case that an anomaly is detected in the facility floor drawing 30E.

The display control unit 24E displays, on the display unit 14, the display screen 58 including the facility floor drawing 30E, which is the target data 30 including the anomaly, and an image E expressing the anomaly detected in the facility floor drawing 30E. Also, the display control unit 24E reads the element information 42, which includes the detected anomaly, from the storage unit 22 and displays the information on the display unit 14. In FIG. 8, the display screen 58 including the element information 42FA including the detected anomaly is illustrated as an example. Also, the display control unit 24E may further display other element information 42, which is linked with the element information 42FA including the detected anomaly. As an example, FIG. 8 illustrates a form displaying the element information 42F expressing past inspection images of the same site, element information 42D expressing past inspection reports, and element information 42C expressing similar case images, in which all the information is linked with the element information 42FA including the detected anomaly.

By displaying the anomaly detection result including the detected anomaly on the display unit 14, the display control unit 24E can provide the anomaly included in the target data 30 in an easily recognizable manner.

Also, the display control unit 24E displays, on the display unit 14, the display screen 58 including the element information 42FA including the detected anomaly and other element information 42 linked with the element information 42FA including the detected anomaly. Therefore, the display control unit 24E can provide a list of the various element information 42 such as maps, drawings, past images related to the anomaly to the user in an easily recognizable manner. Also, the display control unit 24E can provide a course of the anomaly such as aging deterioration in an easily recognizable manner.

Note that, in some cases, at least either one of the element information 42FA including the detected anomaly and other element information 42 linked with the element information 42FA including the detected anomaly includes a hyperlink. In this case, the display control unit 24E may further display, by the display screen 58, the information of a reference address expressed by the hyperlink.

Therefore, the user can easily recognize the anomaly by visually checking the display screen 58 without visually checking the anomaly in real space. Therefore, the information processing apparatus 10 of the present embodiment can reduce the cost taken for the inspection by the user. Also, the display control unit 24E can present past data, related drawings and documents, etc. of the anomaly detected part at the same time by the display screen 58. Therefore, the user can easily recognize the location of the anomaly and the importance of the anomaly. Also, when the user easily recognizes the location of the anomaly and the importance of the anomaly, the cost required to take an anomaly measure such as a repair plan and part replacement can be reduced.

Returning to FIG. 1, the description will be continued. The storage control unit 24G links and stores the element information 42, which includes an anomaly to which selection of anomaly qualification has been received from the user out of the abnormalities included in the displayed anomaly detection result, with anomaly information indicating the anomaly.

It is assumed that the display screen 58 of the anomaly detection result is displayed on the display unit 14 as illustrated in FIG. 8. The user inputs whether to qualify the displayed anomaly as an anomaly or not by operating the input unit 12 while visually checking the display screen 58. Also, the user inputs the information about the qualification result of the displayed anomaly by operating the input unit 12. For example, by operating the input unit 12, the user inputs the information about the qualification result of the anomaly such as whether to qualify it as an anomaly or not and a measure after anomaly occurrence. For example, in some cases, the user takes an anomaly measure such as part replacement with respect to the detected anomaly. In this case, by operating the input unit 12, the user can input the contents of this anomaly measure as the information indicating a measure after anomaly occurrence. Upon input of the contents of the anomaly measure by the user, the display control unit 24E may display, on the display unit 14, an input form for inputting the contents of the anomaly measure. Also, the display control unit 24E may output, from a speaker, sound guidance or the like for inputting the contents of the anomaly measure. The user can input the contents of the anomaly measure, for example, by operating the input unit 12 or by sound input.

When the information about the qualification result of the anomaly received from the input unit 12 includes the information indicating that it is qualified as an anomaly, the storage control unit 24G links and stores the anomaly information with the element information 42 including the anomaly.

FIG. 9 is a schematic diagram illustrating an example of a data configuration of anomaly information 44. For example, the anomaly information 44 includes anomaly information ID, an anomaly occurrence position, anomaly occurrence time, an anomaly degree, a measure after anomaly occurrence, and related element information ID.

The storage control unit 24G generates the anomaly information ID which uniquely identifies the anomaly information 44. Also, the storage control unit 24G specifies the information indicating the measure after anomaly occurrence included in the information about the qualification result of the anomaly received from the input unit 12.

Also, the storage control unit 24G specifies the anomaly degree set in advance. Note that the storage control unit 24G may specify the anomaly degree detected by the anomaly detection unit 24F. Also, the storage control unit 24G may specify the anomaly degree input by the operation of the input unit 12 by the user.

Also, the storage control unit 24G specifies anomaly occurrence time by estimating the anomaly occurrence time. For example, if an anomaly occurrence period can be estimated from the past inspection image 30F, etc., the storage control unit 24G estimates the estimated anomaly occurrence period as the anomaly occurrence time.

Also, the storage control unit 24G specifies the position of the anomaly detected in the target data 30 as the anomaly occurrence position. Also, the storage control unit 24G specifies the element information ID of the element information 42, which includes the detected anomaly, as the related element information ID. Note that the storage control unit 24G specifies, as the related element information ID, any of the element information ID of the pieces of element information 42 displayed in the display screen 58 of the anomaly detection result. More specifically, the storage control unit 24G may specify, as the related element information ID, the element information ID of the element information 42 referenced by the anomaly detection unit 24F and the display control unit 24E when the anomaly is detected. Also, the storage control unit 24G may specify, as the related element information ID, the element information ID of the element information 42 included in the target data 30 created when the user takes an anomaly measure.

Then, the storage control unit 24G generates the anomaly information 44 including the anomaly information ID, the anomaly occurrence position, the anomaly occurrence time, the anomaly degree, the measure after anomaly occurrence, and the related element information ID, which have been generated and specified.

Also, the storage control unit 24G gives the anomaly information ID of the anomaly information 44 to the element information 42 identified by the related element information ID included in the anomaly information 44. In this case, the storage control unit 24G can store, in the storage unit 22, the management DB 40 as a management DB 41 in which the anomaly information ID is further linked and registered.

FIG. 10 is a schematic diagram illustrating an example of a data configuration of the management DB 41. The management DB 41 is a database in which the anomaly information ID is further linked in the management DB 40. Specifically, the management DB 41 is a database in which the element information ID, the element information 42, the related element information ID, and the anomaly information ID are linked.

When the management DB41 in which the element information 42 and the anomaly information ID is linked is stored in the storage unit 22, the storage control unit 24G can link and store the element information 42, which includes the anomaly to which selection of anomaly qualification has been received from the user out of the abnormalities included in the anomaly detection result, with the anomaly information 44.

In this manner, the anomaly detection unit 24F detects the anomaly included in the target data 30, and the storage control unit 24G links and stores the element information 42, which includes the anomaly to which selection of anomaly qualification has been received from the user, with the anomaly information 44.

Therefore, the information processing apparatus 10 of the present embodiment can provide, to the user, the information which enables more precise judgement with respect to abnormalities. For example, the user is enabled to carry out more precise anomaly measures such as inspections, part replacement, and repair plan creation by checking the anomaly information 44.

Also, the storage control unit 24G links and stores the element information 42, which includes the anomaly to which selection of anomaly qualification has been received from the user, with the anomaly information 44. Therefore, for example, if a new anomaly occurs in the related element, the user can easily recognize the location, anomaly degree, etc. of the anomaly by referencing the anomaly information 44. Therefore, the information processing apparatus 10 of the present embodiment can reduce the cost required for a repair plan, part replacement, etc.

Also, the storage control unit 24G may carry out a deleting process of deleting, from the storage unit 22, the element information 42 satisfying a predetermined condition (s) from among the pieces of element information 42 stored in the storage unit 22.

The predetermined conditions can be determined in advance. The predetermined conditions are, for example, the element information 42 with creation time and date which is before the current point of time by a predetermined period or more, the element information 42 having a low importance, etc. The element information 42 having a low importance is, for example, the element information 42 of a deletion target which has been input by an operation instruction of the input unit 12 made by the user. Also, the element information 42 having a low importance is, for example, the element information 42 including the contents having a low importance which is determined in advance. Note that the predetermined conditions may be arbitrarily changed depending on operation instructions, etc. of the input unit 12 made by the user.

The storage control unit 24G carries out the deleting process of deleting the element information 42 satisfying the predetermined condition from the storage unit 22, so that the search time of the element information 42 can be shortened, and free space in the storage unit 22 can be ensured.

Next, an example of a flow of the information processing executed by the information processing apparatus 10 of the present embodiment will be described.

Figure 11:
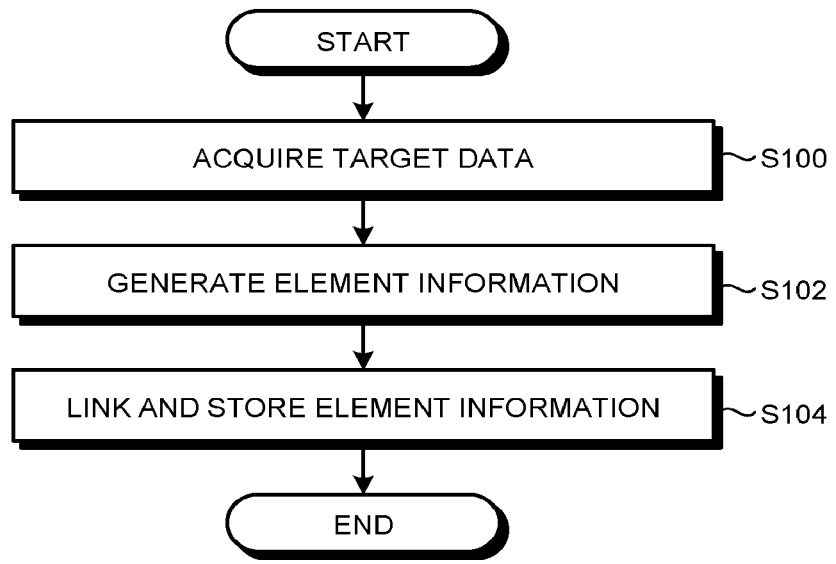
FIG. 11 is a flow chart illustrating a flow of an association process.

FIG. 11 is a flow chart illustrating an example of a flow of an association process executed by the information processing apparatus 10 of the present embodiment.

The acquisition unit 24A acquires pieces of target data 30 from the storage unit 22 (step S100).

The generation unit 24B generates the element information 42, which expresses an element, for each element included in each of the pieces of target data 30 acquired in step S100 (step S102).

The association unit 24C links and stores, in the storage unit 22, the pieces of element information 42 generated in step S102 with each of the related element information 42 (step S104). In the present embodiment, the association unit 24C registers the element information ID, the element information 42, and the related element information ID in the management DB 40 in an linked manner. Then, this routine is finished.

Figure 12:
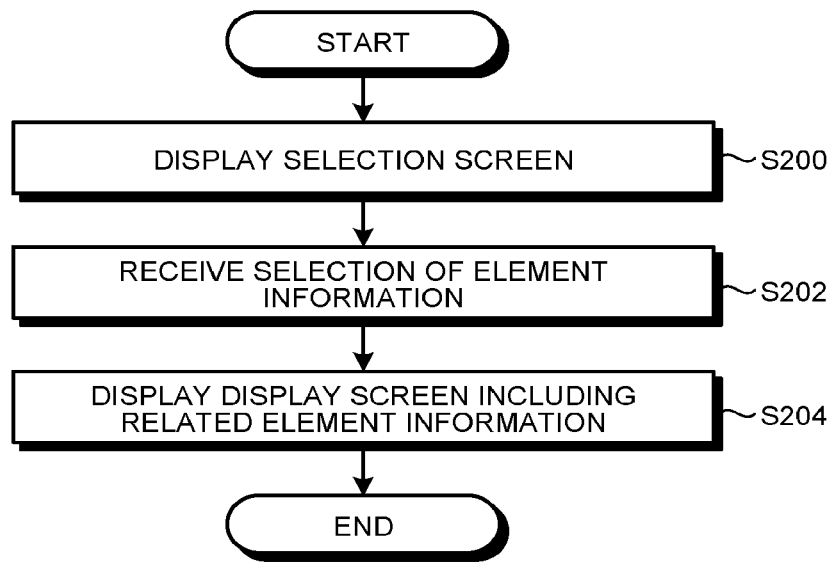
FIG. 12 is a flow chart illustrating a flow of a display process of a display screen.

FIG. 12 is a flow chart illustrating an example of the flow of a display process of the display screen 50 executed by the information processing apparatus 10 of the present embodiment.

The display control unit 24E displays, on the display unit 14, the selection screen 52 for receiving selection of the element information 42 (step S200). For example, the display control unit 24E displays the selection screen 52 illustrated in FIG. 5 on the display unit 14.

The reception unit 24D receives selection of the element information 42 (step S202).

The display control unit 24E generates the display screen 54, which includes the element information 42 to which selection has been received in step S202 and other element information 42 linked with the element information 42, and displays the display screen on the display unit 14 (step S204). Therefore, for example, the display screen 54 illustrated in FIG. 6 is displayed on the display unit 14. Then, this routine is finished.

Figure 13:
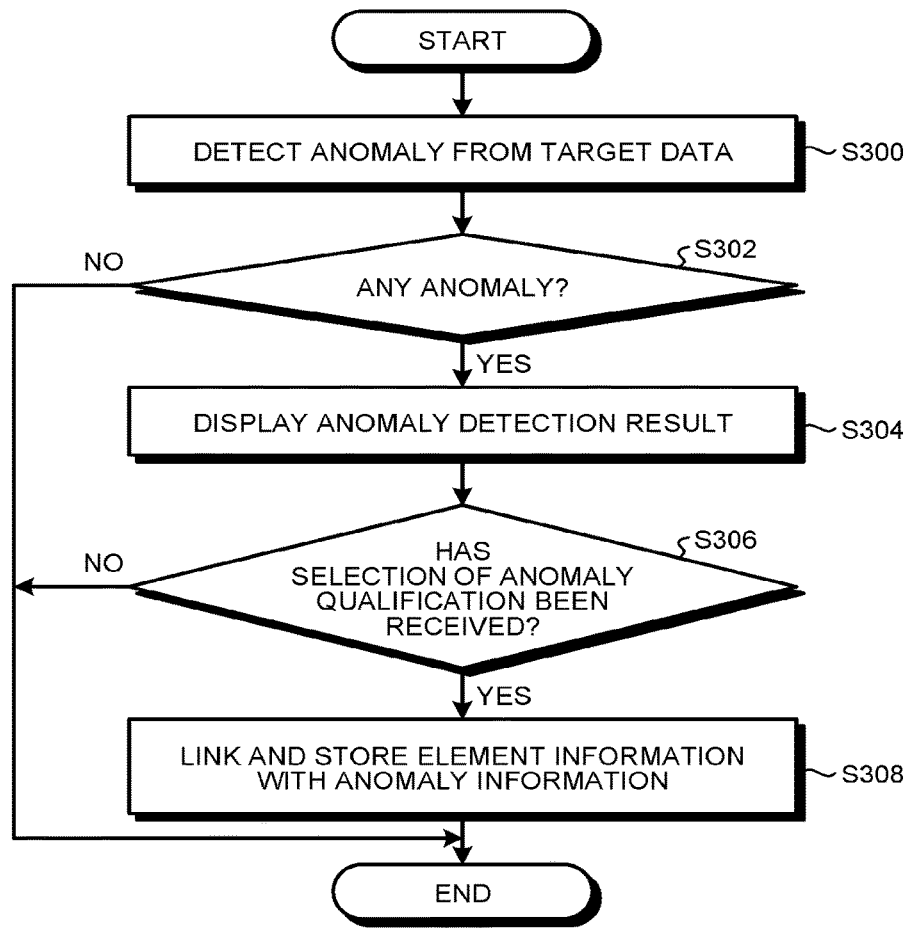
FIG. 13 is a flow chart illustrating a flow of an anomaly detection process.

FIG. 13 is a flow chart illustrating an example of the flow of an anomaly detection process executed by the information processing apparatus 10.

The anomaly detection unit 24F detects an anomaly included in the target data 30 (step S300). When the anomaly detection unit 24F does not detect any anomaly (step S302: No), the present routine is finished. When the anomaly detection unit 24F detects an anomaly (step S302: Yes), the process proceeds to step S304.

In step S304, the display control unit 24E displays the anomaly detection result, which includes the anomaly detected in step S300, on the display unit 14 (step S304). For example, the display unit 14 displays the display screen 58 of the anomaly detection result illustrated in FIG. 8.

The storage control unit 24G determines whether or not the selection of qualifying the anomaly, which has been displayed in step S304, as an anomaly or not has been received (step S306). When the selection expressing that it is not qualified as an anomaly is received (step S306: No), the present routine is finished. When the selection expressing that it is qualified as an anomaly is received (step S306: Yes), the process proceeds to step S308.

In step S308, the storage control unit 24G links and stores the element information 42, which includes the anomaly qualified as the anomaly received in step S306, with the anomaly information 44 (step S308). Then, this routine is finished.

As described above, the information processing apparatus 10 of the present embodiment includes the acquisition unit 24A, the generation unit 24B, and the association unit 24C. The acquisition unit 24A acquires pieces of target data 30 of different types. For each element included in the pieces of target data 30, the generation unit 24B generates element information 42 expressing the element. The association unit 24C links each of the pieces of element information 42 with each of the related element information 42 and stores the information in a storage unit 22.

In the conventional techniques, elements included in pieces of target data 30 of different types are not linked with each other, and it has been difficult to provide groups of related elements included in pieces of target data 30 in a manner that the groups can be easily recognized.

On the other hand, the information processing apparatus 10 according to the present embodiment can link and store, in the storage unit 22, the element information 42 of the multiple elements, which are included in the pieces of target data 30 of the different types, with each of the related element information 42. The information processing apparatus 10 of the present embodiment can provide groups of the element information 42 of particular elements and other element information 42, which is included in each of the pieces of target data 30 of the different types and related to the element information 42 of the particular element, in a manner that the groups can be easily recognized.

Therefore, the information processing apparatus 10 of the present embodiment can provide the groups of the related elements included in the pieces of target data 30 in an easily recognizable manner.

For example, it is assumed that the target data 30 of multiple types related to inspections is used as the pieces of target data 30. In conventional techniques, when inspections of an infrastructure facility are to be carried out, a massive amount of CAD data about the facility, document data such as inspection management tables and work order sheets, past inspection data, etc. has been managed as unintegrated data which is not mutually linked. Therefore, with the conventional techniques, it has not been easy for a user to check the related drawings, document data, past data, etc. upon an inspection. On the other hand, in the information processing apparatus 10 of the present embodiment, the element information 42 of the multiple elements, which are included in the pieces of target data 30 of the different types, is linked and stored with each of the related element information 42 in the storage unit 22. Therefore, the information processing apparatus 10 of the present embodiment can provide the groups of the elements related to a particular inspection element in an easily recognizable manner from the target data 30 of multiple types such as documents, drawings, maps, and inspection results about an infrastructure facility or the like which had been managed in an unintegrated manner.

Next, an example of a hardware configuration of the information processing apparatus 10 of the above described embodiment will be described.

Figure 14:
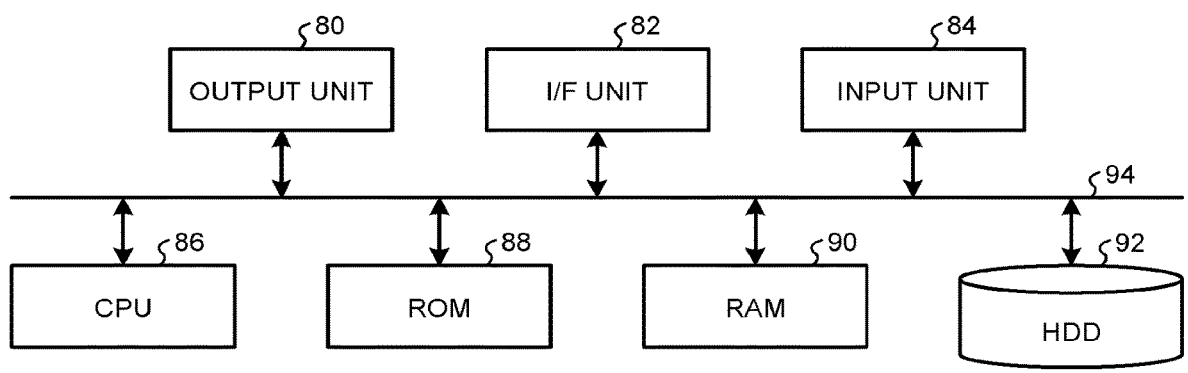
FIG. 14 is a hardware configuration diagram of an information processing apparatus.

FIG. 14 is a hardware configuration diagram of an example of the information processing apparatus 10 of the present embodiment.

The information processing apparatus 10 of the present embodiment has a hardware configuration using a normal computer in which an output unit 80, an I/F unit 82, an input unit 84, a central processing unit (CPU) 86, a read only memory (ROM) 88, a random access memory (RAM) 90, a hard disk drive (HDD) 92, etc. are mutually connected via a bus 94.

The CPU 86 is a computation device which controls the information processing apparatus 10 of the present embodiment. The ROM 88 stores a program, etc. which implements information processing by the CPU 86. The RAM 90 stores the data necessary for various processing by the CPU 86. The I/F unit 82 is an interface for connecting to the input unit 12, the display unit 14, the communication unit 16, etc. illustrated in FIG. 1 and transmitting and receiving data.

In the information processing apparatus 10 of the present embodiment, the above described functions are implemented on a computer when the CPU 86 loads a program from the ROM 88 to the RAM 90 and executes the program.

Note that the program which executes the above described processes executed by the information processing apparatus 10 of the present embodiment may be stored in the HDD 92. Also, the program for executing the above described processes executed by the information processing apparatus 10 of the present embodiment may be provided in a manner that the program is embedded in the ROM 88 in advance.

Also, the program for executing the above described processes executed by the information processing apparatus 10 of the present embodiment may be stored in a computer-readable storage medium such as a CD-ROM, a CD-R, a memory card, a digital versatile disk (DVD), and a flexible disk (FD) in a file of an installable format or an executable format and provided as a computer program product. Also, the program for executing the above described information processing executed by the information processing apparatus 10 of the present embodiment may be stored on a computer connected to a network such as the Internet and provided by downloading via the network. Also, the program for executing the above described information processing executed by the information processing apparatus 10 of the present embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more hardware processors coupled to a memory and configured to:
acquire pieces of target data which is image data,
generate, separate from the target data, element information for each of a plurality of different elements included in each of the pieces of the target data, each of the element information including information of multiple different items related to the corresponding element, the multiple items including at least a first item that is a type of the target data to which the corresponding element belongs and a second item different from the first item,
link, with each other, related pieces of the element information based upon at least information of the second item, and store the linked pieces of the element information in a storage device, wherein the one or more hardware processors are further configured to:
- receive selection of a piece of the element information,
- display, on a display device, a display screen including the selection of the piece of the element information and another piece of the element information linked with the selection of the piece of the element information,
- with respect to pieces of target data of a same type with different creation time and date, mutually compare elements located at a same pixel position in the target data and detect an element which has a difference in a pixel value equal to or higher than a predetermined threshold value as an anomaly included in the target data, and
- display, on the display device, an anomaly detection result including the anomaly.

2. The information processing apparatus according to claim 1, wherein the one or more hardware processors are configured to generate, with respect to the target data, the element information on the basis of a processing result of image processing.

3. The information processing apparatus according to claim 1, wherein the one or more hardware processors are configured to:
- link, with each other, pieces of the element information each including a same item or a similar item, and
- store the linked pieces of the element information in the storage device.

4. The information processing apparatus according to claim 1, wherein the second item includes at least one item out of: the target data to which the element belongs, identification information of the target data to which the element belongs, a position of the element in the target data, a feature of the element, identification information of the element, a type of the element, an estimated position of the element in real space, time and date related to the element, and reference information indicating a reference address related to the element.

5. The information processing apparatus according to claim 1, wherein the one or more hardware processors are further configured to store the element information including the anomaly for which selection of anomaly qualification has been received from a user from among the anomaly included in the displayed anomaly detection result, the element information being stored to have association with anomaly information indicating the anomaly.

6. The information processing apparatus according to claim 5, wherein the one or more hardware processors are configured to delete, from the storage device, a piece of the element information satisfying a predetermined condition out of the pieces of the element information.

7. The information processing apparatus according to claim 1, wherein the pieces of target data are different in at least one of a data format, a data type, a data structure, and a data content.

8. An information processing method comprising:
- acquiring pieces of target data which is image data;
- generating, separate from the target data, element information for each of a plurality of different elements included in each of the pieces of the target data, each of the element information including information of multiple different items related to the corresponding element, the multiple items including at least a first item that is a type of the target data to which the corresponding element belongs and a second item different from the first item;
- associating, with each other, related pieces of the element information based upon at least information of the second item; and
- storing the linked pieces of the element information in a storage device, wherein the method further includes:
- receiving selection of a piece of the element information,
- displaying, on a display device, a display screen including the selection of the piece of the element information and another piece of the element information linked with the selection of the piece of the element information,
- with respect to pieces of target data of a same type with different creation time and date, mutually comparing elements located at a same pixel position in the target data and detecting an element which has a difference in a pixel value equal to or higher than a predetermined threshold value as an anomaly included in the target data, and
- displaying, on the display device, an anomaly detection result including the anomaly.

9. The information processing method according to claim 8, further comprising:
- generating, with respect to the target data, the element information on the basis of a processing result of image processing.

10. The information processing method according to claim 8, further comprising:
- associating, with each other, pieces of the element information each including a same item or a similar item, and
- storing the linked pieces of the element information in the storage device.

11. A computer program product comprising a non-transitory computer-readable recording medium on which a program executable by a computer is recorded, the program instructing the computer to:
- acquire pieces of target data which is image data;
- generate, separate from the target data, element information for each of a plurality of different elements included in each of the pieces of the target data, each of the element information including information of multiple different items related to the corresponding element, the multiple items including at least a first item that is a type of the target data to which the corresponding element belongs and a second item different from the first item;
- link, with each other, related pieces of the element information based upon at least information of the second item; and
- store the linked pieces of the element information in a storage device, wherein the program further instructs the computer to:
- receive selection of a piece of the element information,
- display, on a display device, a display screen including the selection of the piece of the element information and another piece of the element information linked with the selection of the piece of the element information,
- with respect to pieces of target data of a same type with different creation time and date, mutually compare elements located at a same pixel position in the target data and detect an element which has a difference in a pixel value equal to or higher than a predetermined threshold value as an anomaly included in the target data, and display, on the display device, an anomaly detection result including the anomaly.

12. The computer program product according to claim 11, wherein the program instructs the computer to:

generate, with respect to the target data, the element information on the basis of a processing result of image processing.

13. The computer program product according to claim 11, wherein the program instructs the computer to:

link, with each other, pieces of the element information each including a same item or a similar item, and store the linked pieces of the element information in the storage device.

\* \* \* \* \*